US012240244B2

(12) United States Patent
Hanba et al.

(10) Patent No.: US 12,240,244 B2
(45) Date of Patent: Mar. 4, 2025

(54) CARTRIDGE AND PRINTING SYSTEM

(71) Applicant: SEIKO EPSON CORPORATION, Tokyo (JP)

(72) Inventors: Hiroto Hanba, Shiojiri (JP); Yoshihiro Koizumi, Shiojiri (JP); Shun Oya, Kiso-machi (JP); Takumi Nagashima, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 89 days.

(21) Appl. No.: 17/849,918

(22) Filed: Jun. 27, 2022

(65) Prior Publication Data

US 2022/0410575 A1 Dec. 29, 2022

(30) Foreign Application Priority Data

Jun. 28, 2021 (JP) ................................ 2021-106507

(51) Int. Cl.
*B41J 2/175* (2006.01)
*B41J 2/21* (2006.01)

(52) U.S. Cl.
CPC ............ *B41J 2/1752* (2013.01); *B41J 2/2103* (2013.01)

(58) Field of Classification Search
None
See application file for complete search history.

(56) References Cited

U.S. PATENT DOCUMENTS 5,138,344 A 8/1992 Ujita
6,722,762 B2 4/2004 Miyazawa et al.
9,623,665 B2 * 4/2017 Aoki ........................ B41J 2/175
2003/0076391 A1 4/2003 Wilson et al.
2014/0022316 A1 * 1/2014 Nozawa ................. B41J 2/1752 347/86
2014/0240412 A1 8/2014 Oya et al.
2014/0307014 A1 * 10/2014 Nie ...................... B41J 2/17546 347/5

FOREIGN PATENT DOCUMENTS

JP H03-227650 A 10/1991
JP 2002-192744 A 7/2002
JP 2003-127427 A 5/2003
JP 2014-166686 A 9/2014
JP 2016-049722 A 4/2016
JP 2017-185639 A 10/2017

* cited by examiner

*Primary Examiner* — Alejandro Valencia
(74) *Attorney, Agent, or Firm* — Oliff PLC

(57) ABSTRACT

A cartridge includes a liquid container and an adaptor. The liquid container has a liquid storage containing a liquid to be supplied to a printing apparatus, a liquid supply section configured to supply the liquid contained in the liquid storage to a liquid introduction section, and an adaptor mounting section. The adaptor is mounted on the adaptor mounting section and has a terminal placement section in which a cartridge-side terminal electrically connected to an apparatus-side terminal is disposed and an insertion aperture through which the liquid introduction section passes. The adaptor mounting section is provided with a mounting mechanism for mounting the adaptor, which has a predetermined constant shape.

4 Claims, 22 Drawing Sheets

CARTRIDGE AND PRINTING SYSTEM

The present application is based on, and claims priority from JP Application Serial Number 2021-106507, filed Jun. 28, 2021, the present disclosure of which is hereby incorporated by reference herein in its entirety.

BACKGROUND

1. Technical Field

The present disclosure relates to techniques of a cartridge and a printing system.

2. Related Art

JP-A-2002-192744 discloses a technique for attaching a plurality of cartridges having different ink capacities to the cartridge attachment in a printing apparatus. In this technique, each cartridge includes: a liquid storage that contains ink; and an ink supply section having a joint member, such as ink supply holes, via which the liquid storage is coupled to the printing apparatus.

To change the capacity of the liquid storage in a cartridge, the above technique may involve a redesign of the entire cartridge because the liquid storage is integrated with the joint member.

SUMMARY (1) A first aspect of the present disclosure provides a cartridge. The cartridge is to be detachably attached to a cartridge attachment in a printing apparatus. The printing apparatus includes an apparatus-side terminal and a liquid introduction section that receives a liquid. The cartridge includes: a liquid container that includes a liquid storage which contains the liquid to be supplied to the printing apparatus; a liquid supply section configured to supply the liquid contained in the liquid storage to the liquid introduction section; an adaptor mounting section; and an adaptor that is mounted on the adaptor mounting section and that includes a terminal placement section in which a cartridge-side terminal electrically connected to the apparatus-side terminal is disposed and an insertion aperture through which the liquid introduction section passes. The adaptor mounting section has a mounting mechanism for mounting the adaptor, the mounting mechanism having a predetermined constant structure.

(2) A second aspect of the present disclosure provides a printing system. The printing system includes: a printing apparatus that has a cartridge attachment to which a cartridge is to be attached; and a plurality of cartridges according to the above aspect. The plurality of cartridges include a first cartridge and a second cartridge and are detachably attached to the cartridge attachment. The first cartridge has a first liquid storage as the liquid storage, whereas the second cartridge has a second liquid storage as the liquid storage. The first liquid storage and the second cartridge have different capacities.

(3) A third aspect of the present disclosure provides a printing system. The printing system includes: a printing apparatus that has a cartridge attachment to which a cartridge is to be attached; and a plurality of cartridges according to the above aspect. The plurality of cartridges include a first cartridge and a second cartridge and are detachably attached to the cartridge attachment. The first cartridge has a first liquid storage as the liquid storage, whereas the second cartridge has a second liquid storage as the liquid storage. The first liquid storage and the second cartridge have different capacities. When a direction orthogonal to an insertion direction of the cartridges is represented by a width direction, and a direction orthogonal to both the insertion direction and the width direction is represented by a height direction, a length of the first liquid storage in at least one of the insertion direction, the width direction, and the height direction differs from a length of the second liquid storage so that the first liquid storage and the second liquid storage have different capacities.

DESCRIPTION OF EXEMPLARY EMBODIMENTS

A. First Embodiment

A-1. Configuration of Printing System

Figure 1:
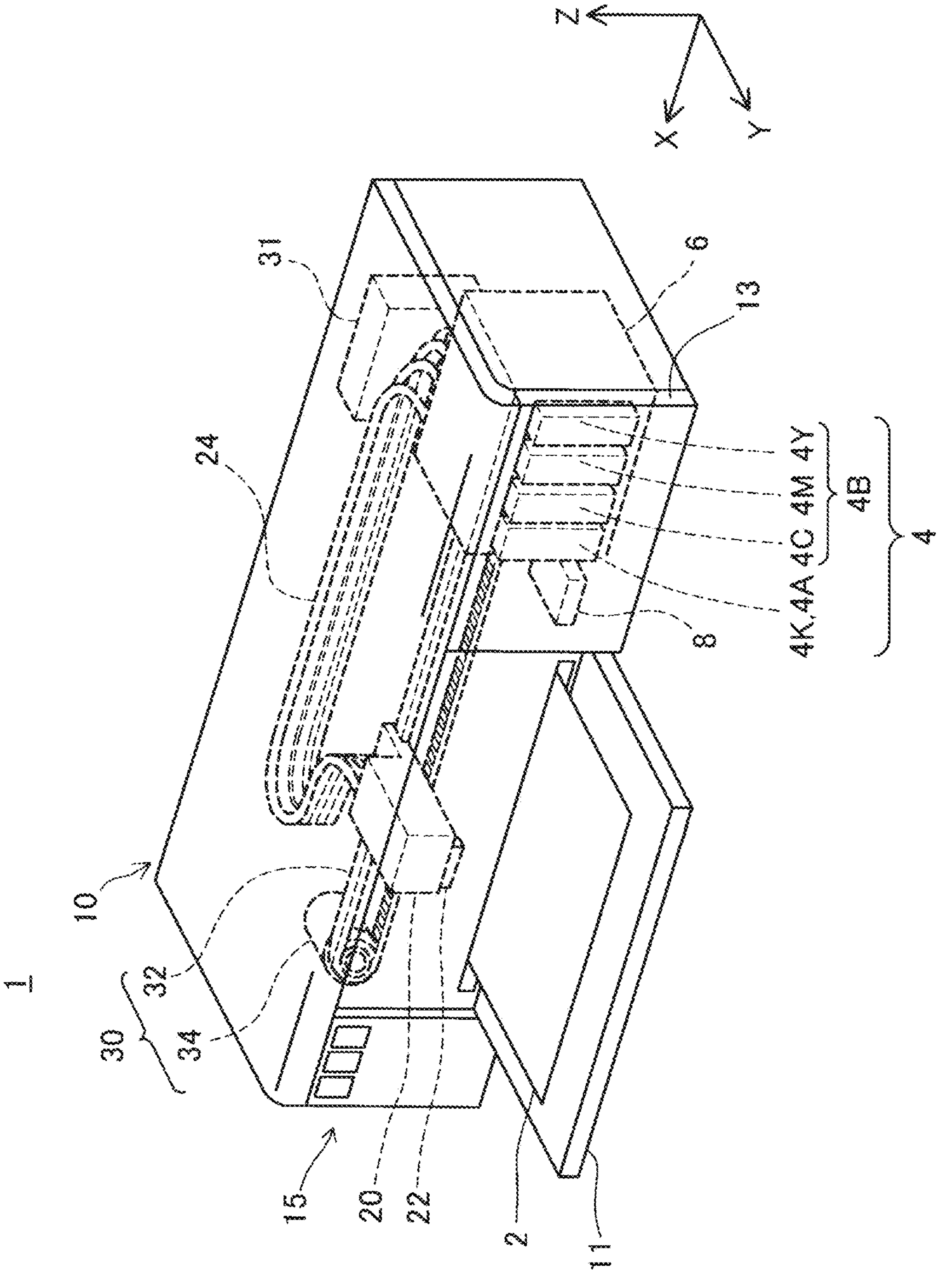
FIG. 1 is a perspective view of a configuration of a printing system according to a first embodiment of the present disclosure.

FIG. 1 is a perspective view of a configuration of a printing system 1 according to a first embodiment of the present disclosure. FIG. 1 also illustrates three space axes (X-, Y-, and Z-axes) orthogonal to one another. The directions of the three arrows along the X, Y, and Z axes correspond to positive directions, namely, the +X, +Y, and +Z directions, respectively; the directions opposite to those of the arrows along the X-, Y-, and Z-axes correspond to negative directions, namely, the −X, −Y, and −Z directions, respectively. This coordinate system is also applied to other drawings and explanations.

The printing system 1 includes: a printing apparatus 10; and a plurality of cartridges 4 from which liquids, or inks in this case, are to be supplied to the printing apparatus 10.

In this embodiment, the printing apparatus 10 may be an ink jet printer equipped with a discharge head 22 that discharges the liquids, or the inks, to the outside. In addition, the printing apparatus 10 may be a large-sized printer that prints images on large-format sheets such as A2- to A0-sized posters. The printing apparatus 10 includes a cartridge attachment 6, a controller 31, a carriage 20, the discharge head 22, and a drive mechanism 30. The printing apparatus 10 also includes operation buttons 15, which allow a user to operate the printing apparatus 10.

Figure 8:
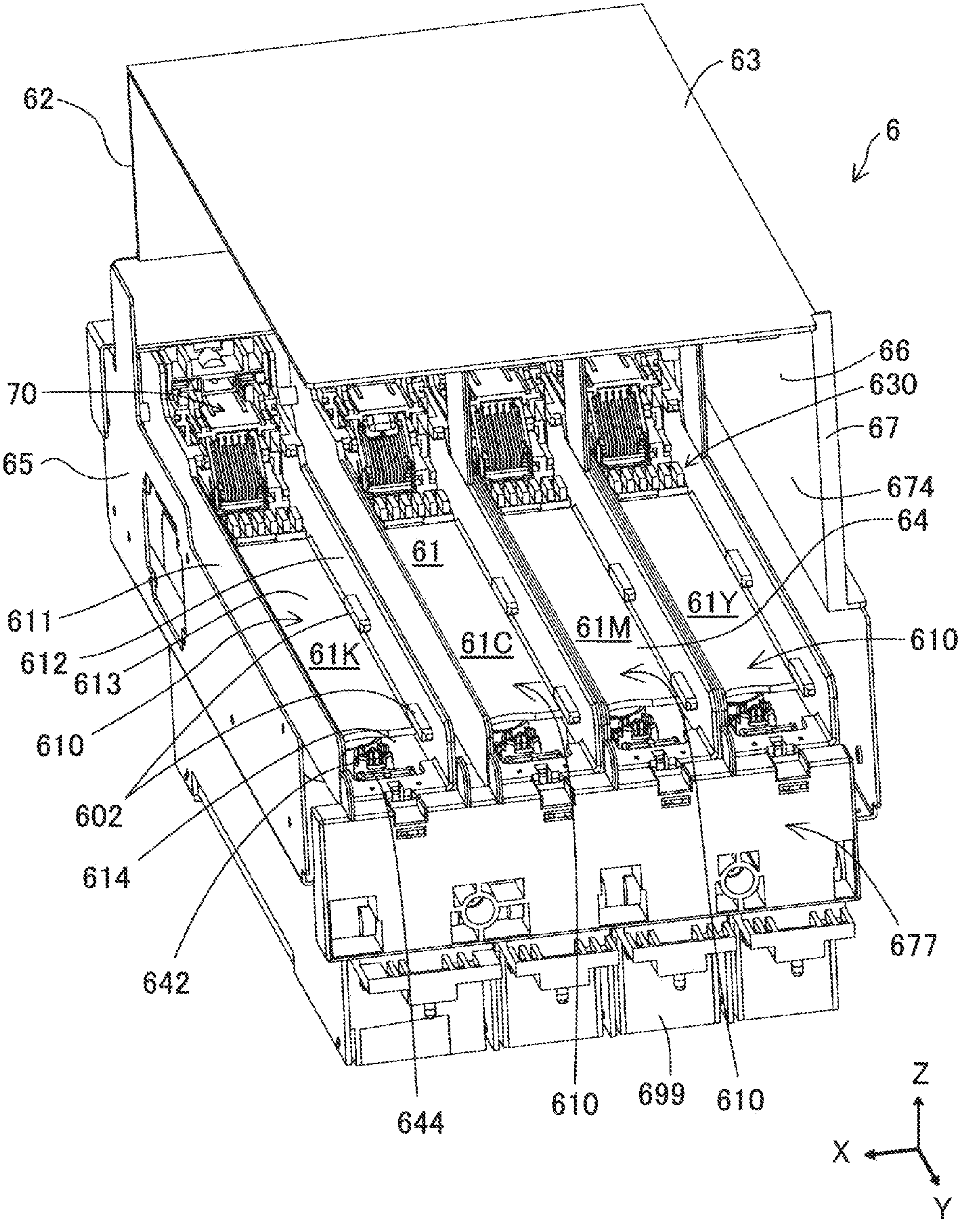
FIG. 8 is a perspective view of the cartridge attachment.

As illustrated in FIG. 8 (referenced later), the cartridge attachment 6 includes a first apparatus wall 67 on the +Y-directional side, which has an insertion/extraction aperture 674 through which the cartridges 4 are accessible to the interior of a storage chamber 61. The cartridge attachment 6 removably accommodates the plurality of cartridges 4. In this embodiment, the cartridge attachment 6 may accommodate four cartridges 4 in relation to four inks: black, yellow, magenta, and cyan inks. The cartridge 4 containing the black ink may also be referred to as the cartridge 4K; the cartridge 4 containing the yellow ink may also be referred to as the cartridge 4Y; the cartridge 4 containing the magenta ink may also be referred to as the cartridge 4M; and the cartridge 4 containing the cyan ink may also be referred to as the cartridge 4C. In this embodiment, the cartridge 4K may contain a larger amount of liquid than any of the other cartridges (cartridges 4C, 4M, and 4Y). The cartridge 4K may also be referred to as the first cartridge 4A; each of the cartridges 4C, 4M, and 4Y may also be referred to as the second cartridge 4B.

The printing apparatus 10 further includes a replacement cover 13 on the +Y-directional side. When the replacement cover 13 is pivoted around the shaft on its −Z-directional side in the forward direction, namely, in the +Y direction, the aperture of the cartridge attachment 6 is exposed, in which case a cartridge 4 can be attached to or detached from the cartridge attachment 6. When a cartridge 4 is attached to the cartridge attachment 6, the ink contained in the cartridge 4 is supplied to the discharge head 22 disposed inside the carriage 20 through a tube 24, which serves as a liquid supply pipe. In this embodiment, the ink may be supplied from the cartridge 4 to the discharge head 22 in accordance with the difference in ink surface level between the cartridge mounting section 6 and the discharge head 22. In another embodiment, the ink in the cartridge 4 may be sucked by a pump mechanism (not illustrated) disposed in the printing apparatus 10 and supplied to the discharge head 22. A plurality of tubes 24 may be disposed in relation to the inks. When a cartridge 4 is attached to the cartridge attachment 6, the ink is supplied to the printing apparatus 10. Hereinafter, the state where the liquid, or the ink, can be supplied from a cartridge 4 to the printing apparatus 10 is referred to as the attached state.

The discharge head 22 has a plurality of nozzles in relation to the inks. Through the nozzles, the discharge head 22 discharges the inks onto a printing paper sheet 2 in droplet form, thereby printing predetermined texts and images based on print data. In this embodiment, the printing apparatus 10 may employ an off-carriage type, in which the cartridge attachment 6 is kept stationary independently of the movement of the carriage 20. However, it should be noted that the technique of the present disclosure may also be applicable to on-carriage type printers, in which the carriage 20 is disposed inside the cartridge attachment 6 and is movable together with the cartridge attachment 6.

The controller 31 controls individual sections in the printing apparatus 10 and transmits/receives signals to or from the cartridges 4. The carriage 20 moves the discharge head 22 relative to the printing apparatus 10.

The drive mechanism 30 causes the carriage 20 to reciprocate in accordance with a control signal from the controller 31. The drive mechanism 30 includes a timing belt 32 and a drive motor 34. The drive motor 34 transmits its mechanical power to the carriage 20 through the timing belt 32, thereby causing the carriage 20 to reciprocate in the main scanning directions, namely, in the ±X directions. The printing apparatus 10 further includes a transport mechanism that feeds the printing paper sheet 2 in the sub-scanning direction, namely, in the +Y direction. More specifically, the transport mechanism feeds the printing paper sheet 2 in the sub-scanning direction during the print operation and, after the print operation, ejects the printing paper sheet 2 onto the surface of a front cover 11.

A region called a home position is reserved outside the print area in which the carriage 20 reciprocates in the main scanning directions. At this home position, a maintenance mechanism is disposed to maintain the discharge head 22 so that the discharge head 22 can perform the printing operation properly. The maintenance mechanism includes a cap member 8, an elevator mechanism (not illustrated), and a suction pump (not illustrated). The cap member 8 is pressed against the bottom surface of the discharge head 22 on which the nozzles are arranged, to create the enclosed space housing the nozzles. The elevator mechanism moves the cap member 8 vertically so as to press the cap member 8 against the nozzle surface of the discharge head 22. The suction pump generates negative pressure inside the enclosed space between the cap member 8 and the nozzle surface of the discharge head 22.

In this embodiment, when the printing system 1 is in use, the sub-scanning direction in which the printing paper sheet 2 is fed may be along the Y-axis, the direction of gravitational force may be along the Z-axis, and the directions in which the carriage 20 reciprocates may be along the X-axis. The expression “printing system 1 is in use” means that the printing system 1 is in the state of being installed on a horizontal, flat surface. In this embodiment, the sub-scanning direction may be identical to the +Y direction; the direction opposite to the sub-scanning direction may be identical to the −Y direction; the direction of gravitational force may be identical to the −Z directions the direction of antigravitational force may be identical to the +Z direction; and the horizontal direction may be identical or parallel to the ±X and ±Y directions. When the printing system 1 is viewed from the front side, the direction from the right to the left is identical to the +Y direction, and the opposite direction is identical to the −X direction. In this embodiment, an insertion direction D1 (see FIG. 2) in which a cartridge 4 is inserted into and attached to the cartridge attachment 6 may be identical to the −Y direction; the direction in which the cartridge 4 is detached and de-inserted from the cartridge attachment 6 may be identical to the +Y direction. The direction from the front to the rear of the cartridge attachment 6 may be identical to the −Y direction; the direction from the rear to the front of the cartridge attachment 6 may be identical to the +Y direction. In this embodiment, the plurality of cartridges 4 may be arranged side by side in the +X direction.

A-2. Process of Attaching Cartridge, and Attached State of Cartridge

Figure 2:
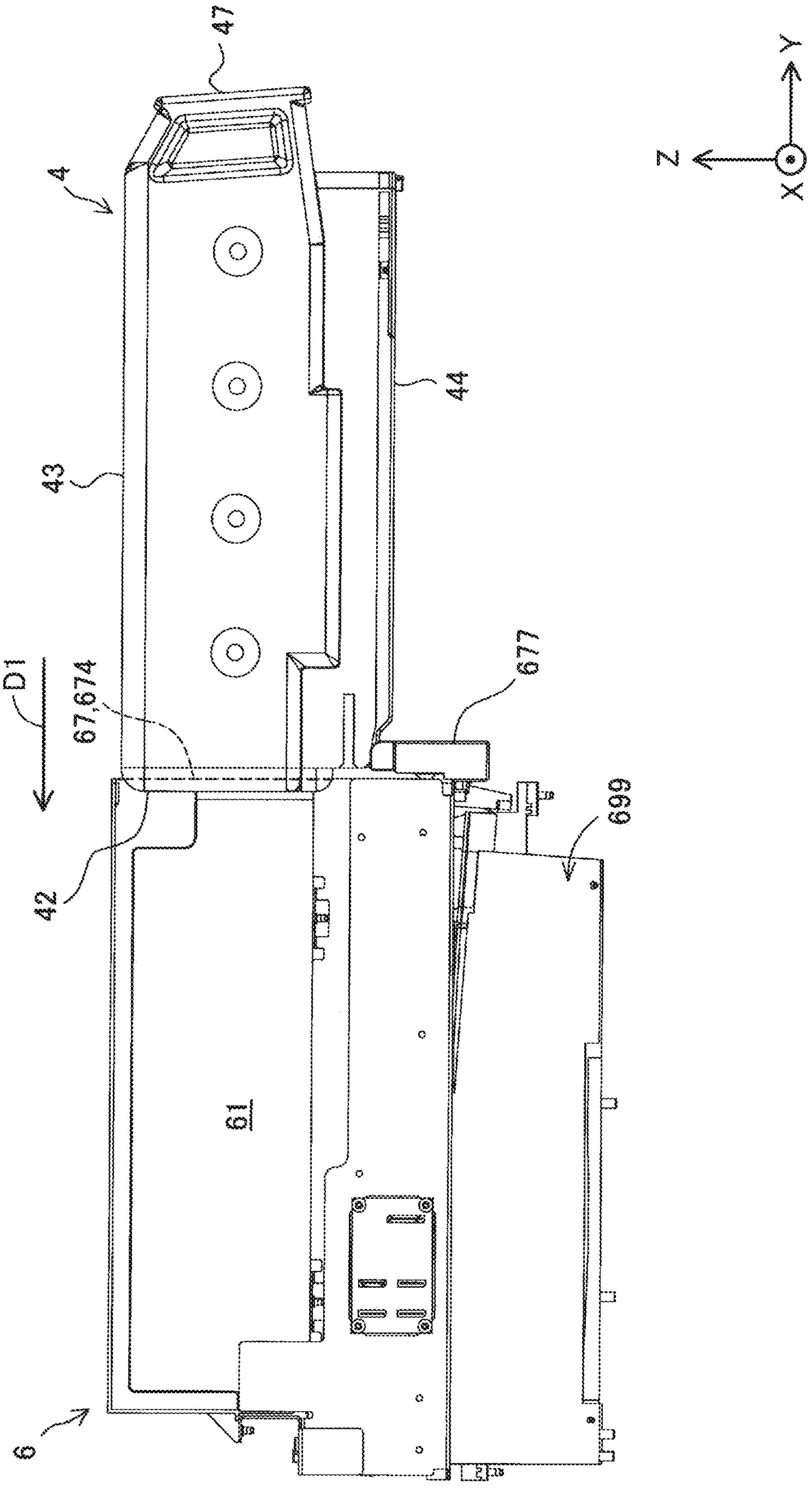
FIG. 2 is a first explanatory view of a process of attaching a cartridge to the cartridge attachment in the printing apparatus.
Figure 3:
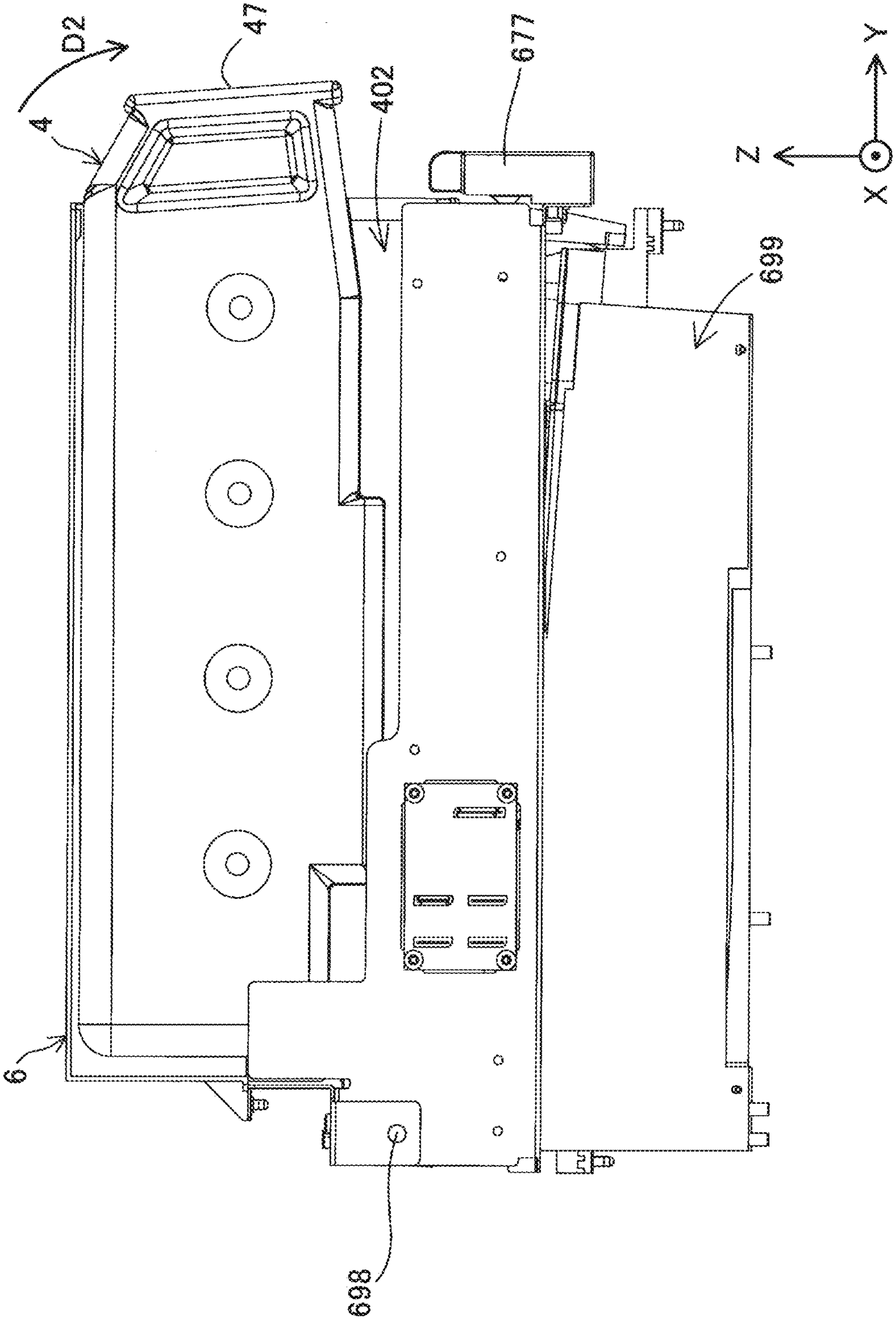
FIG. 3 is a second explanatory view of the attaching process.

FIG. 2 is a first explanatory view of a process of attaching a cartridge to the cartridge attachment 6; FIG. 3 is a second explanatory view of the attaching process; and FIG. 4 illustrates the attached state where the cartridge 4 is completely attached to the cartridge attachment 6.

The attaching process includes: a terminal connecting subprocess; and a supply section coupling subprocess that is performed in the wake of the terminal connecting subprocess. The terminal connecting subprocess is performed as illustrated in FIG. 2. Further, a user slides a cartridge 4 in the insertion direction D1, namely, in the −Y direction and then inserts the cartridge 4 into the storage chamber 61 in the cartridge attachment 6 through the insertion/extraction aperture 674 of the first apparatus wall 67 until cartridge-side terminals 521 (see FIG. 7) of the cartridge 4 come into contact with apparatus-side terminals 721 (see FIG. 7) of the cartridge attachment 6. In this way, the electrical connection between the cartridge 4 and the cartridge attachment 6 is established. In the wake of this subprocess, the supply section coupling subprocess is performed as illustrated in FIGS. 3 and 4. Further, the user couples the liquid supply section 442 (see FIG. 6) of the cartridge 4 to a liquid introduction section 642 (see FIG. 6) of the cartridge attachment 6, with the electrical connection between the cartridge-side terminals 521 and the apparatus-side terminals 721 maintained. More specifically, in the supply section coupling subprocess, the user rotates a rear wall 47 of the cartridge 4 around a rotation fulcrum 698 of the cartridge attachment 6 in the connection direction D2 indicated by the arrow until the liquid supply section 442 has coupled to the liquid introduction section 642. In the attached state, as illustrated in FIG. 4, the cartridge 4 engages with an engagement forming body 677 of the cartridge attachment 6 which is disposed close to the first apparatus wall 67. In this way, the attached state is created.

Figure 4:
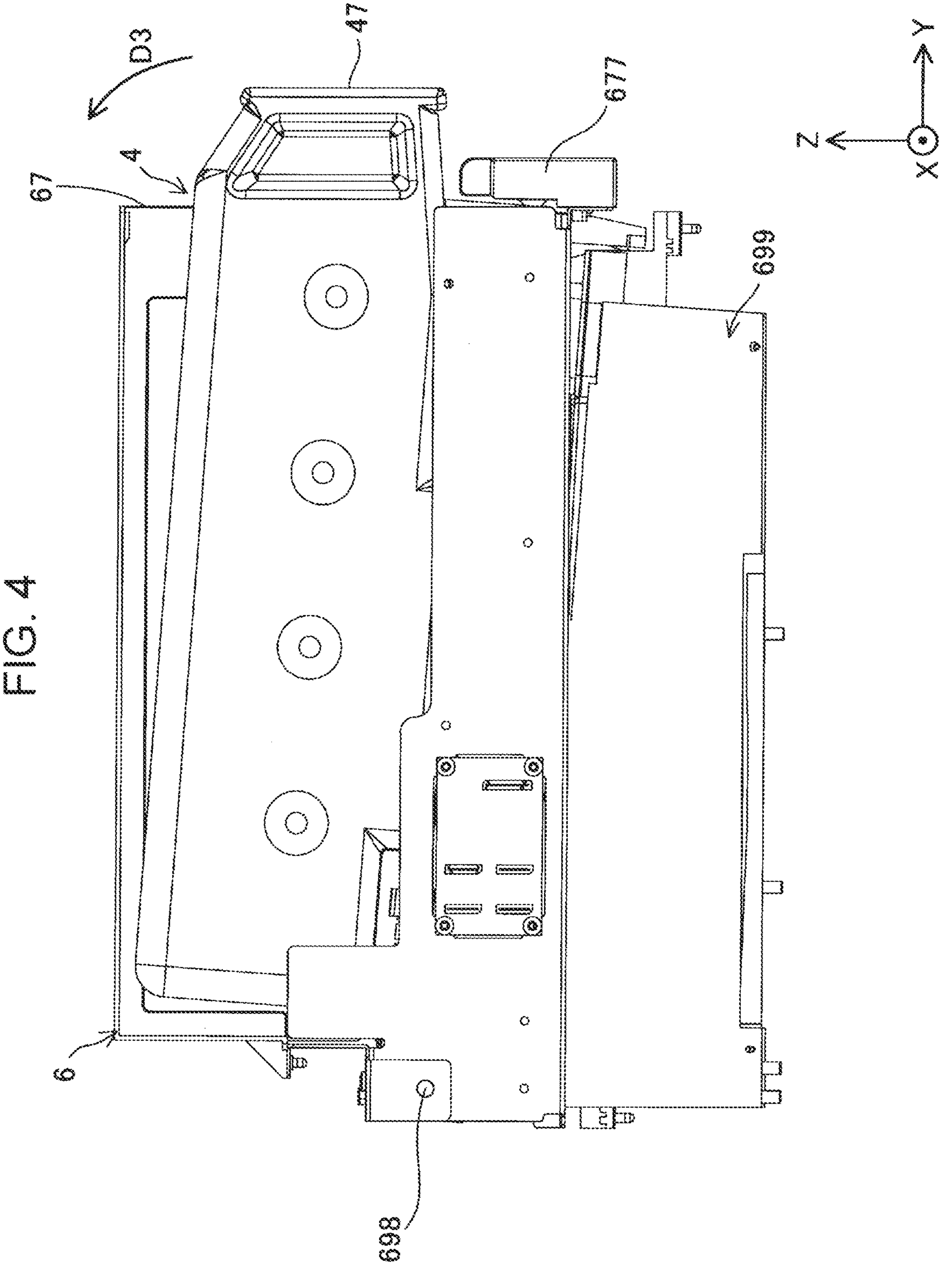
FIG. 4 illustrates an attached state where the cartridge is completely attached to the cartridge attachment.

To de-insert the cartridge 4 from the cartridge attachment 6, as illustrated in FIG. 4, the user slightly lifts the rear wall 47 of the cartridge 4 and then rotates the rear wall 47 around the rotation fulcrum 698 in a disconnection direction D3, which is opposite to the connection direction D2. During the rotation, the engagement of the cartridge 4 with the engagement forming body 677 is released. When the cartridge 4 enters the state of FIG. 3 as a result of the rotation of the cartridge 4 in the disconnection direction D3, the user slides the cartridge 4 in the de-insertion direction, or in the +Y direction, until the cartridge 4 has been detached from the cartridge attachment 6.

A-3. Attached State of Cartridge

Figure 5:
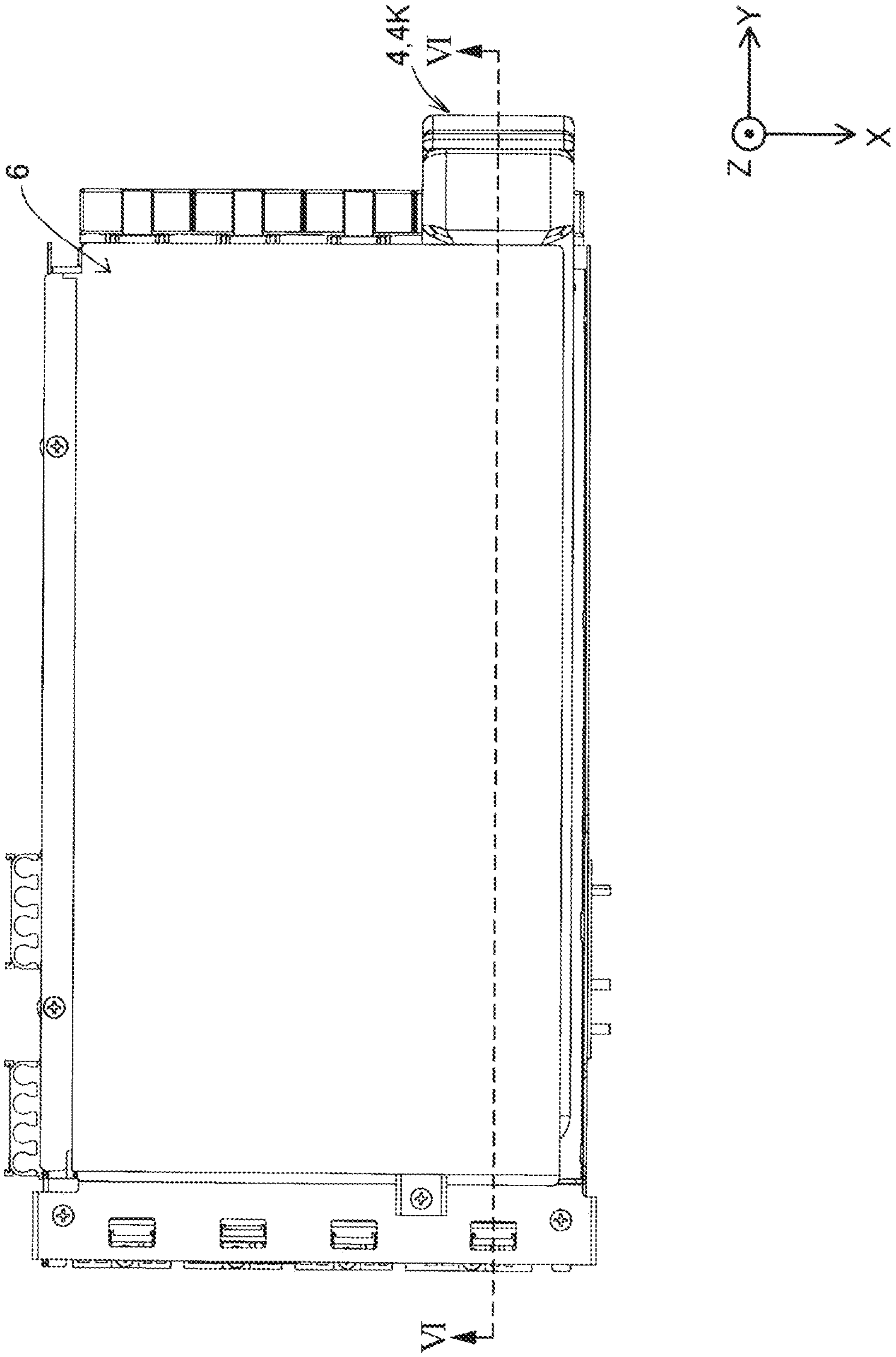
FIG. 5 illustrates the cartridge attachment as viewed from the +Z-directional side.
Figure 6:
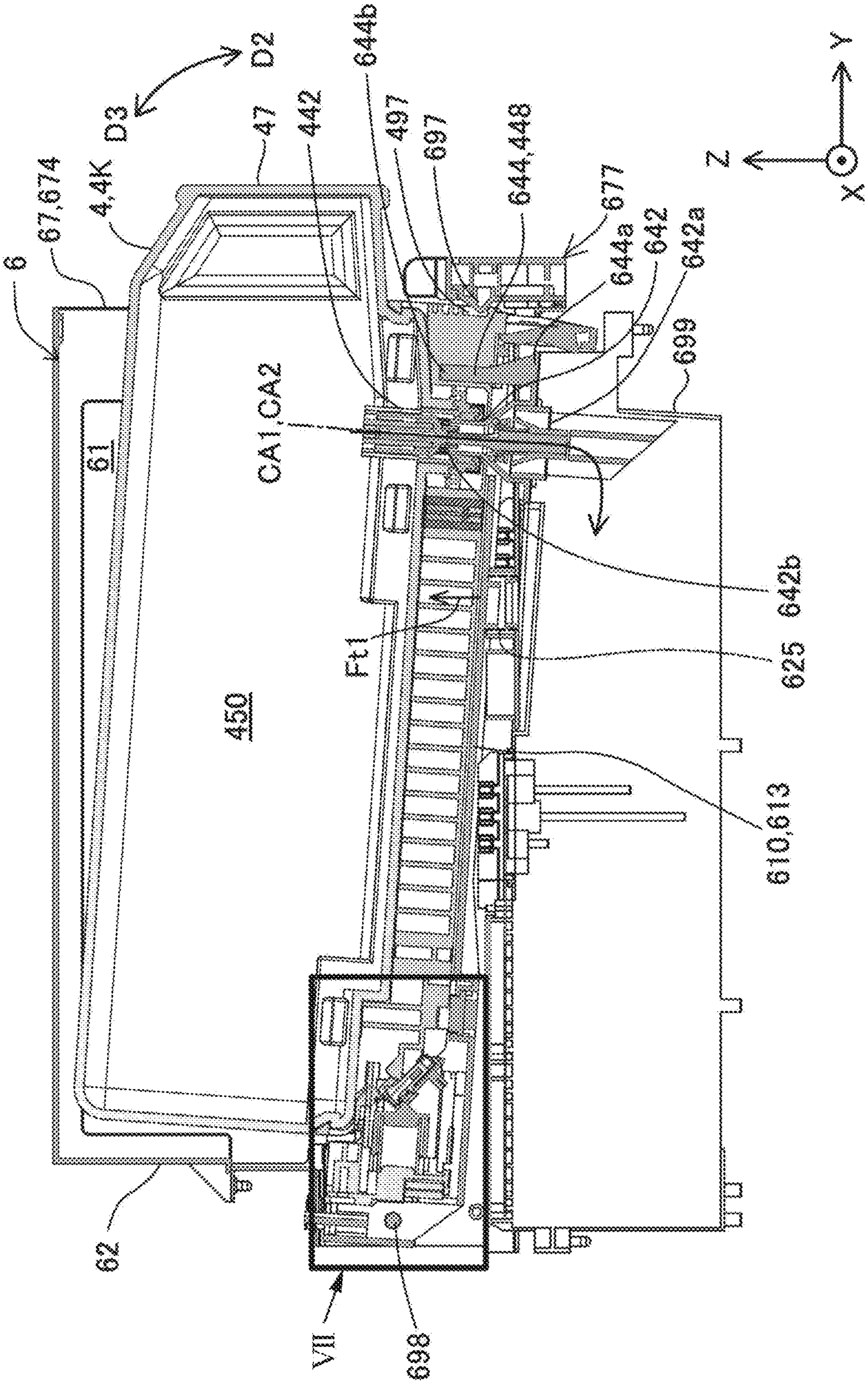
FIG. 6 is a cross-sectional view of the cartridge attachment taken along line VI-VI in FIG. 5.
Figure 7:
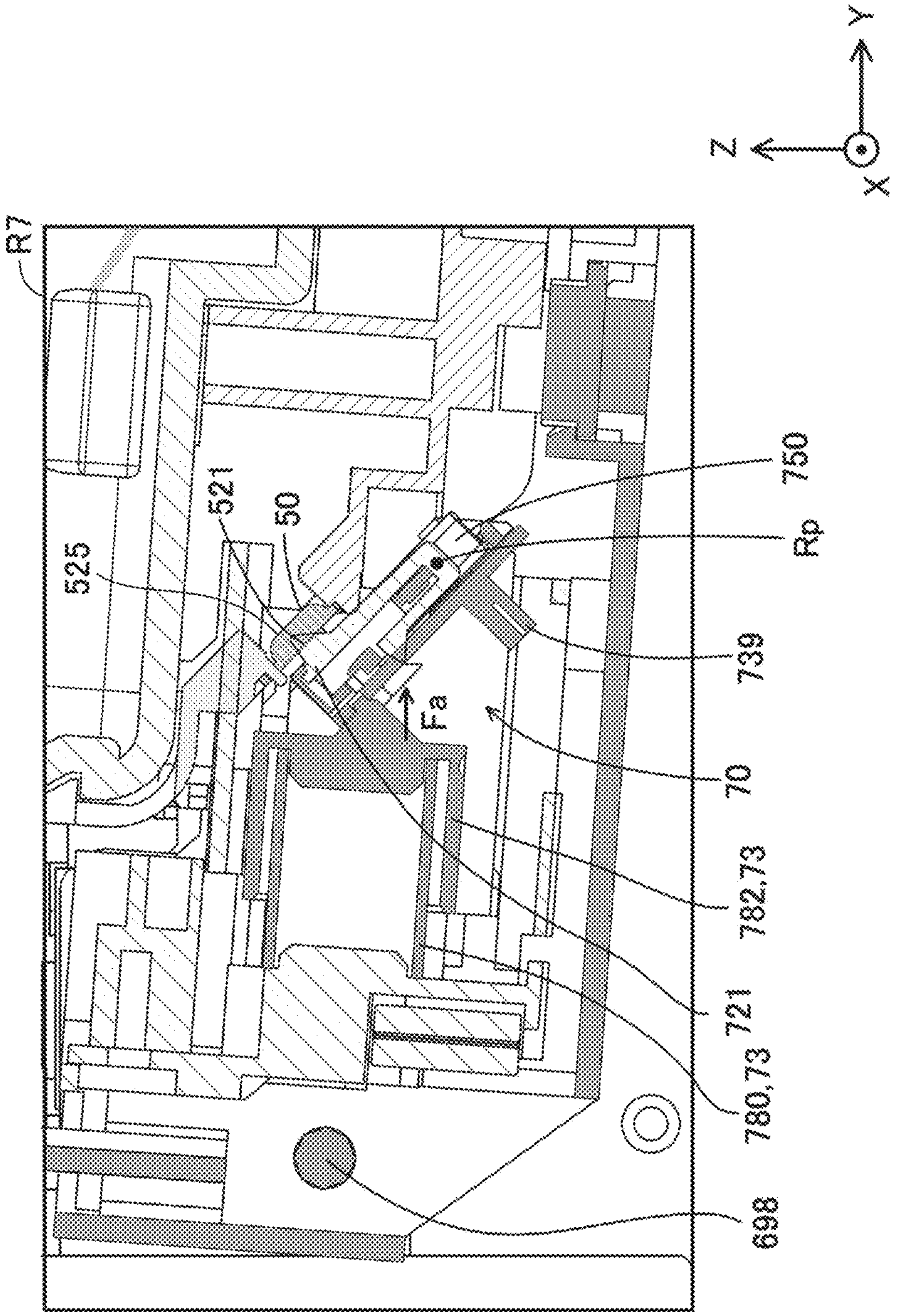
FIG. 7 is an enlarged view of the region VII in the cartridge attachment in FIG. 6.

FIG. 5 illustrates the cartridge attachment 6 as viewed from the +Z-directional side; FIG. 6 is a cross-sectional view of the cartridge attachment 6 taken along line VI-VI in FIG. 5; and FIG. 7 is an enlarged view of the region VII in FIG. 6. In FIG. 5, the cartridge 4K is attached to the cartridge attachment 6. With reference to FIGS. 5 to 7, the attached state of a cartridge 4 will be described below. It should be noted that the attached state of each of the cartridges 4C, 4M, and 4Y is substantially the same as that of the cartridge 4K.

As illustrated in FIG. 6, the cartridge attachment 6 includes a support member 610 that forms the storage chamber bottom wall of the storage chamber 61 and that supports the cartridge 4 from the bottom. When inserted into the storage chamber 61 of the cartridge attachment 6, the cartridge 4 is supported by the support member 610 from the −Z-directional side. In the attached state where the cartridge 4 is attached to the storage chamber 61 of the cartridge attachment 6, the liquid supply section 442 of the cartridge 4 is coupled to the liquid introduction section 642 of the cartridge attachment 6. As a result, the liquid contained in a liquid storage 450 of the cartridge 4 is supplied to the liquid introduction section 642 through the liquid supply section 442. In this embodiment, the liquid is supplied from the liquid supply section 442 to the liquid introduction section 642, whereas the air contained in a liquid reservoir 699 of the cartridge attachment 6 turns out to be bubbles, which then move into the liquid storage 450 through the liquid introduction section 642 and the liquid supply section 442 in this order. In this way, the air and the liquid are exchanged in the liquid storage 450. In another embodiment, the cartridge 4 may have an atmosphere communication path via which the liquid storage 450 communicates with the outside and may exchange the air and the liquid via this atmosphere communication path. The atmosphere communication path may be disposed at a location different from that of the liquid supply section 442. For example, the atmosphere communication path may be formed on the wall that defines the liquid storage 450.

The liquid introduction section 642 receives the liquid from the cartridge 4. The liquid introduction section 642, which is a cylindrical member having an internal passage along which the liquid flows, has a base end 642*a* and a leading end 642*b*. The leading end 642*b* has an aperture to which the internal passage in the liquid introduction section 642 leads. Through this aperture, the ink in the liquid supply section 442 is supplied to the internal passage. The base end 642*a* is coupled to the liquid reservoir 699 and allows the ink to be supplied to the liquid reservoir 699 after the ink has passed through the internal passage. The liquid reservoir 699, which is positioned on the −Z-directional side of the storage chamber 61, communicates with the interior of the discharge head 22 through a corresponding tube 24 illustrated in FIG. 1. In the attached state, a central axis CA1 of the liquid introduction section 642 is parallel to a central axis CA2 of the liquid supply section 442 while inclined with respect to the Z-axis. In addition, the central axis CA1, along which the liquid introduction section 642 extends, intersects the insertion direction D1 of the cartridge 4. In this case, the liquid supply section 442 extends along the central axis CA2.

As illustrated in FIG. 7, when the cartridge 4 is in the attached state, a circuit board 50 mounted in the cartridge 4 is in contact with an apparatus-side terminal section 70 of the cartridge attachment 6 so that the electrical connection between the cartridge 4 and the cartridge attachment 6 is established. The apparatus-side terminal section 70 is retained by the holding mechanism 73. The apparatus-side terminal section 70 includes the plurality of apparatus-side terminals 721, a terminal holder 750, and a connector 739.

In this embodiment, nine apparatus-side terminals 721, each of which may be a metal plate member, are arranged in the apparatus-side terminal section 70. Each apparatus-side terminal 721 has a terminal rotation fulcrum RP, and the portion of each apparatus-side terminal 721 which is in contact with the cartridge-side terminals 521 of the circuit board 50 is elastically deformable in the ±Y and ±Z directions with respect to the terminal rotation fulcrum Rp. The plurality of apparatus-side terminals 721 are retained by the terminal holder 750. The connector 739 is electrically connected to the plurality of the apparatus-side terminals 721 and also to the controller 31 in the printing apparatus 10 via wires (not illustrated) so that the controller 31 can transmit/receive data to or from the circuit board 50.

The holding mechanism 73 includes: a first biasing member 780 made of a coil spring; and a mounting member 782, over which the first biasing member 780 is disposed and on which the apparatus-side terminal section 70 is mounted. After the cartridge 4 has been completely inserted into the cartridge attachment 6, the first biasing member 780 is compressed to apply an external force Fa to the apparatus-side terminal section 70 via the mounting member 782 toward the first apparatus wall 67, namely, in the de-insertion direction of the cartridge 4. With the external force Fa, the apparatus-side terminal section 70 is pressed against the circuit board 50, thereby reliably maintaining the contact between the apparatus-side terminals 721 and the cartridge-side terminals 521.

As described above, the holding mechanism 73 retains the apparatus-side terminal section 70 so as to be able to be displaced in the insertion direction D1 of the cartridge 4. The end of the first biasing member 780 on the apparatus-side terminal section 70 side is slightly movable in the ±X and ±Z directions, all of which intersect the insertion direction D1. Thus, the holding mechanism 73 retains the apparatus-side terminal section 70 so as to be able to be slightly displaced in the ±X and ±Z directions, all of which intersect the insertion direction D1.

In the supply section coupling subprocess, as illustrated in FIG. 6, an apparatus-side supply-section positioning unit 644, which is a projection formed in the cartridge attachment 6, engages with a supply-section positioning unit 448, which is a recess formed in the cartridge 4. This configuration suppresses the liquid supply section 442 from moving in directions intersecting the central axis CA2 of the liquid supply section 442, thereby positioning the liquid supply section 442 relative to the liquid introduction section 642. More specifically, before the liquid introduction section 642 is inserted into the liquid supply section 442 of the cartridge 4, namely, before the coupling between the liquid introduction section 642 and the liquid supply section 442 of the cartridge 4 is established, the apparatus-side supply-section positioning unit 644 is inserted into the supply-section positioning unit 448. The apparatus-side supply-section positioning unit 644, which may have a substantially cubic shape, has a first end 644*a* disposed on the liquid reservoir 699 side and a second end 644*b* disposed closer to the storage chamber 61 than the first end 644*a* is.

When the cartridge 4 is in the attached state, a main wall 613 forms the bottom of the support member 610 while inclined with respect to the Y-axis. More specifically, the main wall 613 of the support member 610 is inclined toward the −Z-directional side in the +Y direction. Before the cartridge 4 is attached to the cartridge attachment 6, namely, when the cartridge attachment 6 is in the initial state, the main wall 613 is substantially parallel to the Y-axis.

The cartridge attachment 6 further includes a second biasing member 625 that, when the cartridge 4 is in the attached state, applies an external force Ft1 to the support member 610 toward the initial location thereof. When the cartridge 4 is in the attached state, the second biasing member 625, which may be a coil spring disposed between the support member 610 and the liquid reservoir 699, is compressed to apply the external force Ft1 having a +Z-directional component to the support member 610. Meanwhile, a cartridge engagement section 497 of the cartridge 4 keeps engaging with an attachment engagement section 697 of the cartridge attachment 6, thereby maintaining the attached state. The attachment engagement section 697 is formed on the engagement forming body 677, which is positioned in the portion of the cartridge attachment 6 close to the first apparatus wall 67.

As illustrated in FIG. 6, as described above, when the support member 610 is rotated around the rotation fulcrum 698 in the connection direction D2, the liquid supply section 442 moves downward and couples to the liquid introduction section 642. When the support member 610 is rotated around the rotation fulcrum 698 in the disconnection direction D3, the liquid supply section 442 moves upward and decouples from the liquid introduction section 642. As a result, the coupling between the liquid supply section 442 and the liquid introduction section 642 is released.

A-4. Detailed Configuration of Cartridge Attachment

Figure 9:
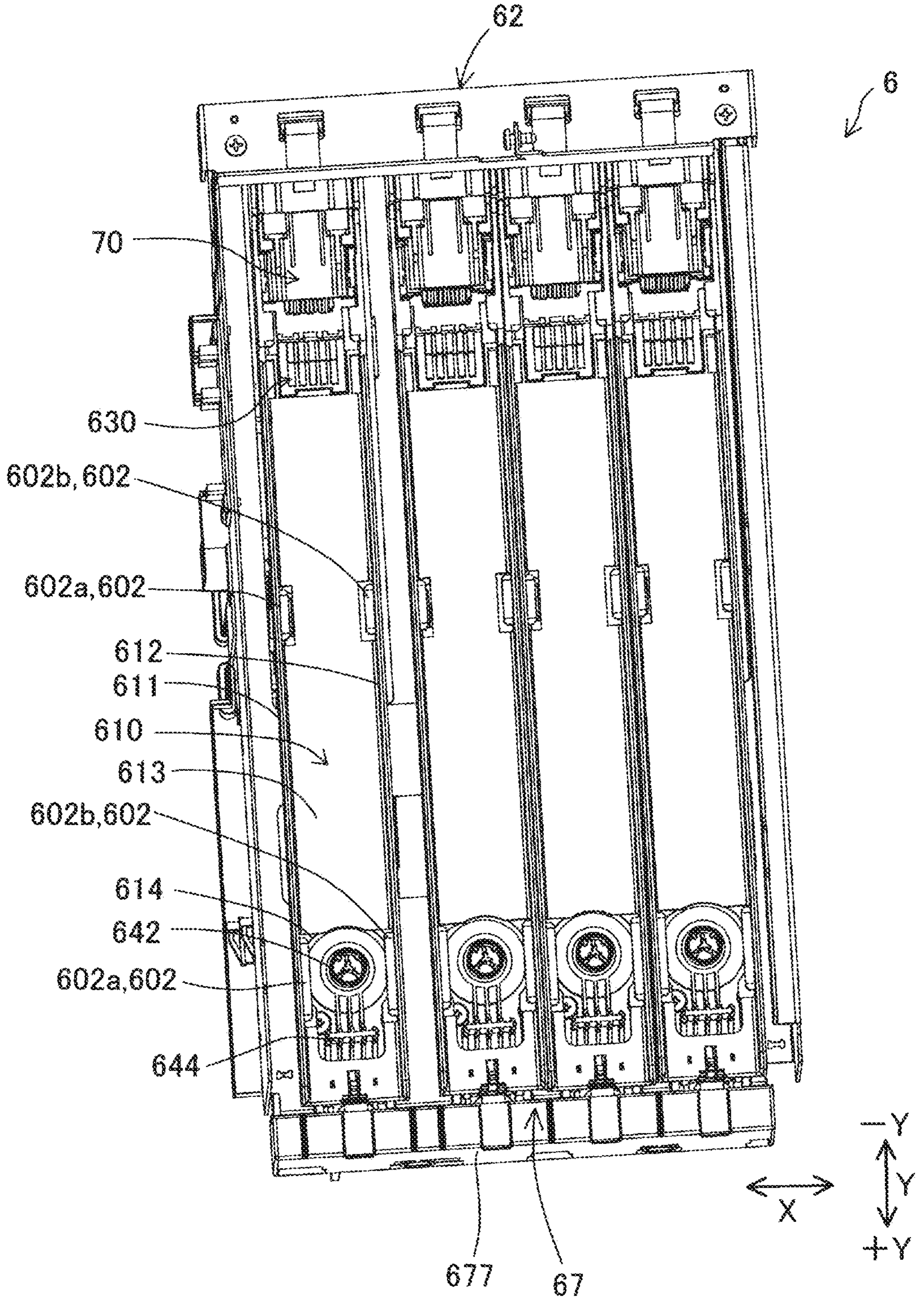
FIG. 9 illustrates the cartridge attachment as viewed from the +Z-directional side.

FIG. 8 is a perspective view of the cartridge attachment 6; FIG. 9 illustrates the cartridge attachment 6 as viewed from the +Z-directional side. It should be noted that the configuration of the cartridge attachment 6 is partly omitted in FIGS. 8 and 9, for the purpose of facilitating understanding of the configuration. The +X direction is sometimes referred to as the width direction of the cartridge attachment 6; the +Y direction is sometimes referred to as the depth direction of the cartridge attachment 6; and the +Z direction is sometimes referred to as the height direction of the cartridge attachment 6. Hereinafter, some components of the cartridge attachment 6 will be described. It should be noted that, unless otherwise specified, the cartridge attachment 6 is in the initial state where no cartridges 4 are attached to the cartridge attachment 6.

As illustrated in FIG. 8, the cartridge attachment 6 is provided with the storage chamber 61 having a substantially cubic shape, for example, which can accommodate the cartridges 4. The storage chamber 61 has slots 61C, 61M, 61Y, and 61K on which the cartridges 4C, 4M, 4Y, and 4K, respectively, are to be mounted; the slots 61C, 61M, 61Y, and 61K conform to, respectively, the outer shapes of the cartridges 4C, 4M, 4Y, and 4K. In this embodiment, the cartridge 4K may contain a larger amount of liquid and thus longer in the width direction, or in the +X direction, than any of the other cartridges (cartridges 4C, 4M, and 4Y). In this embodiment, the width of the slot 61K thus may have a greater width than that of any of the other slots (slots 61Y, 61M, and 61C).

As illustrated in FIG. 8, the storage chamber 61 of the cartridge attachment 6 is defined by six apparatus walls: a second apparatus wall 62, an apparatus top wall 63, an apparatus bottom wall 64, a first apparatus sidewall 65, a second apparatus sidewall 66, and a first apparatus wall 67. The "wall" described herein refers to not only a single wall but also a structure formed of a plurality of walls. The first apparatus wall 67 is provided with the insertion/extraction aperture 674 through which a cartridge 4 passes when the cartridge is inserted into or de-inserted from the storage chamber 61. The second apparatus wall 62 is positioned on the −Y-directional side of the storage chamber 61 and faces the first apparatus wall 67 in the +Y direction. The second apparatus wall 62 may be a substantially vertical wall when the printing apparatus 10 is in use.

The apparatus top wall 63 is positioned on the +Z-directional side of the storage chamber 61, whereas the apparatus bottom wall 64 is positioned on the −Z-directional side of the storage chamber 61 and faces the apparatus top wall 63 in the +Z direction. The apparatus bottom wall 64, which is formed by support members 610, has a plurality of apparatus apertures 614. In this embodiment, four apparatus apertures 614 may be formed in relation to the slots 61C, 61M, 61Y, and 61K. Each of the apparatus top wall 63 and the apparatus bottom wall 64 intersects both of the second apparatus wall 62 and the first apparatus wall 67. The word "intersection" described herein refers to one of the following states: (i) a state where one of two components intersect the other; (ii) a state where the extended line of one of two components intersects the other; and (iii) a state where the extended line of one of two components intersects the extended line of the other.

The first apparatus sidewall 65 is positioned on the +X-directional side of the storage chamber 61, whereas the second apparatus sidewall 66 is positioned on the −X-directional side of the storage chamber 61 and faces the first apparatus sidewall 65 in the +X direction. Each of the first apparatus sidewall 65 and the second apparatus sidewall 66 intersects the second apparatus wall 62, the first apparatus wall 67, the apparatus top wall 63, and the apparatus bottom wall 64.

As illustrated in FIGS. 8 and 9, the cartridge attachment 6 further includes the support members 610, liquid introduction sections 642, apparatus-side supply-section positioning units 644, apparatus guides 602, and the engagement forming body 677. The number of support members 610 disposed in the cartridge attachment 6 is related to the number of cartridges 4 to be attached thereto. In this embodiment, four support members 610 may be disposed. The support members 610 form the apparatus bottom wall 64 on the downstream side of the storage chamber 61 in the direction of gravitational force and support the cartridges 4 from the downstream side in the direction of gravitational force, or in the −Z direction. Each of the support members 610 extends in the +Y direction and is depressed in the −Z direction. Each support member 610 includes: a main wall 613 that forms the apparatus bottom wall 64; a first support sidewall 611; and a second support sidewall 612.

The main wall 613 forms the bottom depressed in the direction of gravitational force. One of both ends of the main wall 613 which is closer to the first apparatus wall 67 is provided with the apparatus aperture 614, which is formed across the main wall 613 in a thickness direction thereof.

As illustrated in FIG. 8, the first support sidewall 611 is erected from the +X-directional side of the main wall 613 in the direction opposite to the direction of gravitational force, or in the +Z direction, whereas the second support sidewall 612 is erected from the −X-directional side of the main wall 613 in the +Z direction. The first support sidewall 611 faces the second support sidewall 612 in the +X direction.

The apparatus guides 602 are disposed in each support member 610 and guide the cartridge 4 when the cartridge 4 is slid along the main wall 613 in the insertion direction D1 or the de-insertion direction. The apparatus guides 602 are disposed on both the first support sidewall 611 and the second support sidewall 612. Each of the apparatus guides 602 disposed on both the first support sidewall 611 and the second support sidewall 612 may be a projection. As illustrated in FIG. 9, each first support sidewall 611 has first apparatus guides 602*a*, each of which may be a projection that protrudes from the first support sidewall 611 to the second support sidewall 612. The first apparatus guides 602*a* are arranged at regular intervals in the +Y direction while widening in the +Y direction. Likewise, each second support sidewall 612 has second apparatus guides 602*b*, each of which may be a projection that protrudes from the second support sidewall 612 to the first support sidewall 611. The second apparatus guides 602*b* are arranged at regular intervals in the +Y direction while widening in the direction.

As illustrated in FIGS. 8 and 9, the liquid introduction sections 642 receive the liquids from the respective cartridges 4. When the cartridge attachment 6 is in the initial state, the liquid introduction sections 642 are positioned outside the storage chamber 61 and on the −Z-directional side with respect to the storage chamber 61. In other words, the liquid introduction sections 642 face the respective support members 610 with the storage chamber 61 therebetween. This configuration can suppress the cartridge 4 from accidentally coming into contact with the liquid introduction section 642 when a cartridge 4 is inserted into the storage chamber 61 of the cartridge attachment 6. As illustrated in FIG. 6, as described above, when the support members 610 are rotated around the rotation fulcrum 698 in the connection direction D2, the apparatus apertures 614 move downward. In response, the leading ends 642*b* of the liquid introduction sections 642 are inserted into the storage chamber 61. In short, the rotation fulcrum 698 serving as a displacement mechanism allows the support members 610 to rotate around the rotation fulcrum 698. Therefore, the apparatus apertures 614 are displaced in the direction of gravitational force, thereby inserting the leading end 642*b* of the liquid introduction section 642 into the storage chamber 61 through the apparatus apertures 614.

The supply-section positioning units 448 receive the respective apparatus-side supply-section positioning units 644 as illustrated in FIG. 8, thereby suppressing the liquid supply sections 442 from moving relative to the liquid introduction section 642, namely, positioning the liquid supply sections 442. When the cartridge attachment 6 is in the initial state, the apparatus-side supply-section positioning units 644 are positioned outside the storage chamber 61 and on the −Z-directional side with respect to the storage chamber 61. In other words, the apparatus-side supply-section positioning units 644 face the respective support members 610 with the storage chamber 61 therebetween. This configuration can suppress the cartridge 4 from accidentally coming into contact with the apparatus-side supply-section positioning unit 644 when a cartridge 4 is inserted into the storage chamber 61 of the cartridge attachment 6. When the support members 610 are rotated around the rotation fulcrum 698 in the connection direction D2, the apparatus apertures 614 move downward. In response, the second ends 644*b* of the apparatus-side supply-section positioning units 644 are inserted into the storage chamber 61. In short, the rotation fulcrum 698 allows the support member 610 to rotate around the rotation fulcrum 698. Therefore, the apparatus apertures 614 are displaced in the direction of gravitational force, thereby inserting the second ends 644*b* of the apparatus-side supply-section positioning units 644 into the storage chamber 61 through the apparatus apertures 614.

As illustrated in FIG. 9, the cartridge attachment 6 further includes apparatus-side terminal sections 70 as described above and apparatus-side identification members 630. The apparatus-side identification members 630 are used to identify whether the cartridges 4C, 4M, 4Y, and 4K are correctly mounted, respectively, on the slots 61C, 61M, 61Y, and 61K of the storage chamber 61. The apparatus-side identification members 630 create patterns, the shapes of which are unique to the colors of the liquids contained in the cartridges 4C, 4M, 4Y, and 4K. Although the patterns of the apparatus-side identification members 630 on the slots 61C, 61M, 61Y, and 61K seemingly have the same shape in FIG. 8, those patterns actually have different shapes. The apparatus-side identification members 630 are mounted on the main walls 613 of the support member 610.

Each of the apparatus-side identification members 630 is formed of one or more ribs. The number and locations of the ribs determine the pattern of each apparatus-side identification member 630. Likewise, each cartridge 4 has a cartridge-side identification member 430 (see FIG. 15) formed of one or more ribs. The cartridge-side identification member 430 has a pattern, the shape of which depends on the type of the cartridge 4, or the color of the liquid contained therein. If a cartridge 4 is correctly mounted on a corresponding one of the slots 61C to 61K, the cartridge-side identification member 430 does not come into contact with the apparatus-side identification member 630. If a cartridge 4 is incorrectly mounted on one of the slots 61C to 61K, the cartridge-side identification member 430 comes into contact with the apparatus-side identification member 630, thereby hindering the cartridge 4 from being further slid inwardly. This configuration can reduce the risk of a cartridge 4 being incorrectly mounted on any of the slots 61C to 61K of the cartridge attachment 6.

As illustrated in FIG. 8, the engagement forming body 677 is positioned on the +Y-directional side with respect to the support members 610 and also on the −Z-directional side with respect to the insertion/extraction aperture 674. In addition, the engagement forming body 677 has four attachment engagement sections 697 in relation to the slots 61C to 61K.

A-5. Detailed Configuration of First Cartridge

Figure 10:
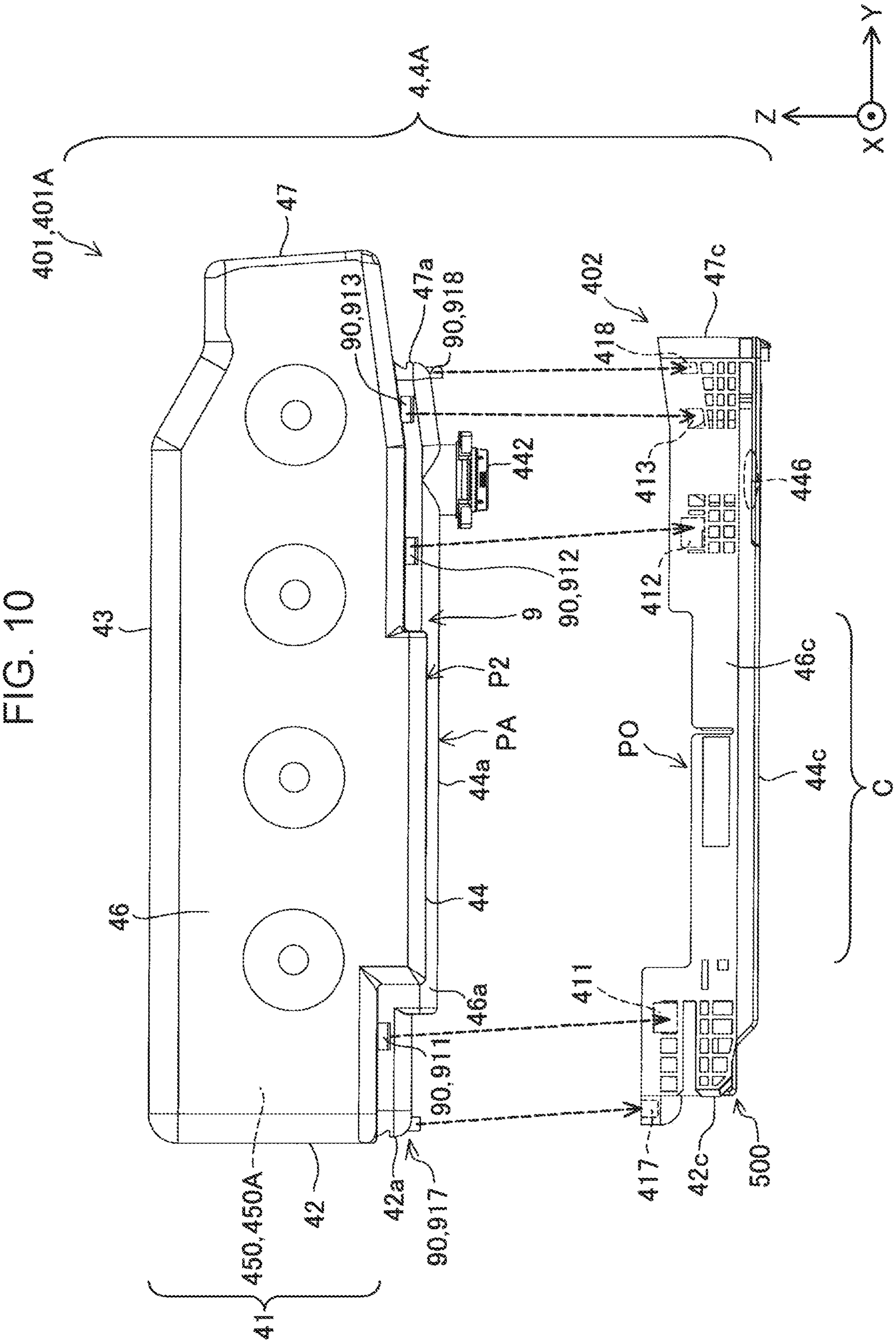
FIG. 10 is a first exploded view of the first cartridge according to the first embodiment.
Figure 11:
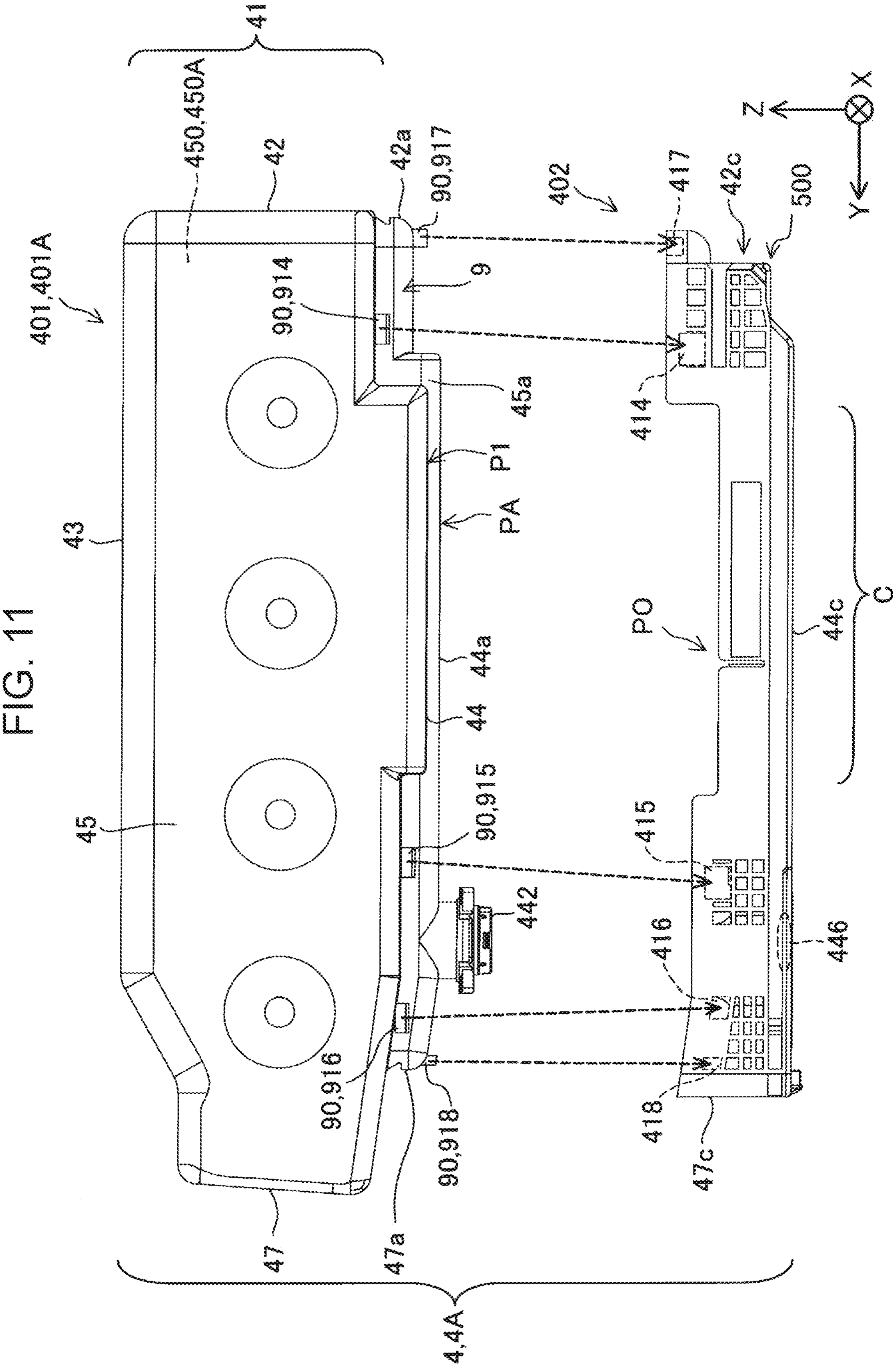
FIG. 11 is a second exploded view of the first cartridge according to the first embodiment.
Figure 12:
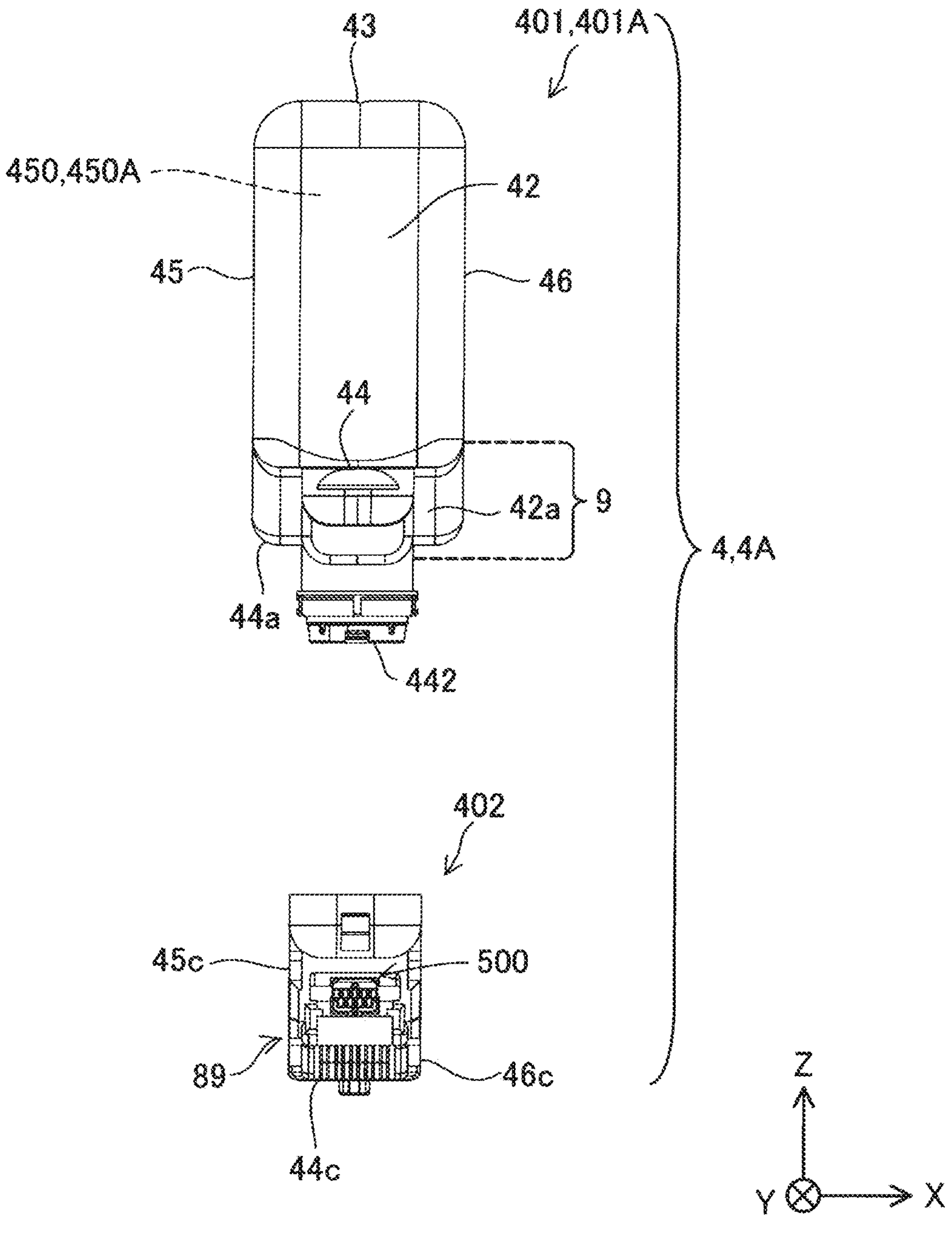
FIG. 12 as a third exploded view of the first cartridge according to the first embodiment.
Figure 13:
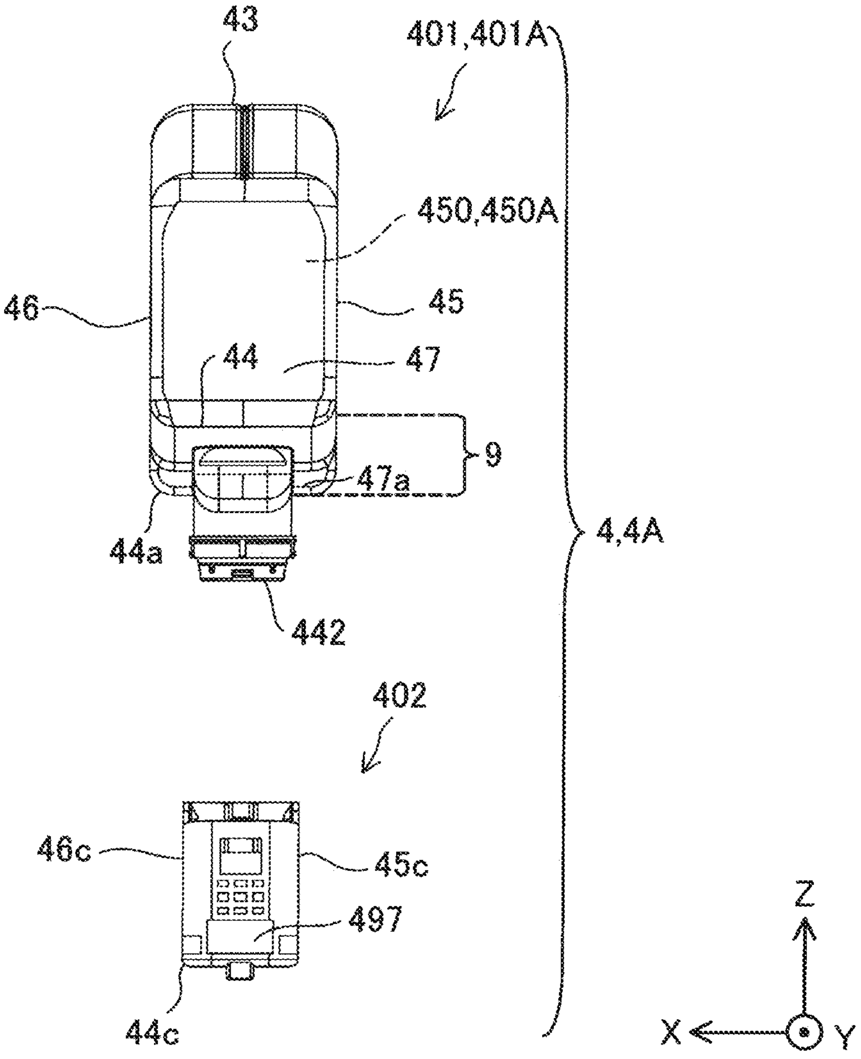
FIG. 13 is a fourth exploded view of the first cartridge according to the first embodiment.
Figure 14:
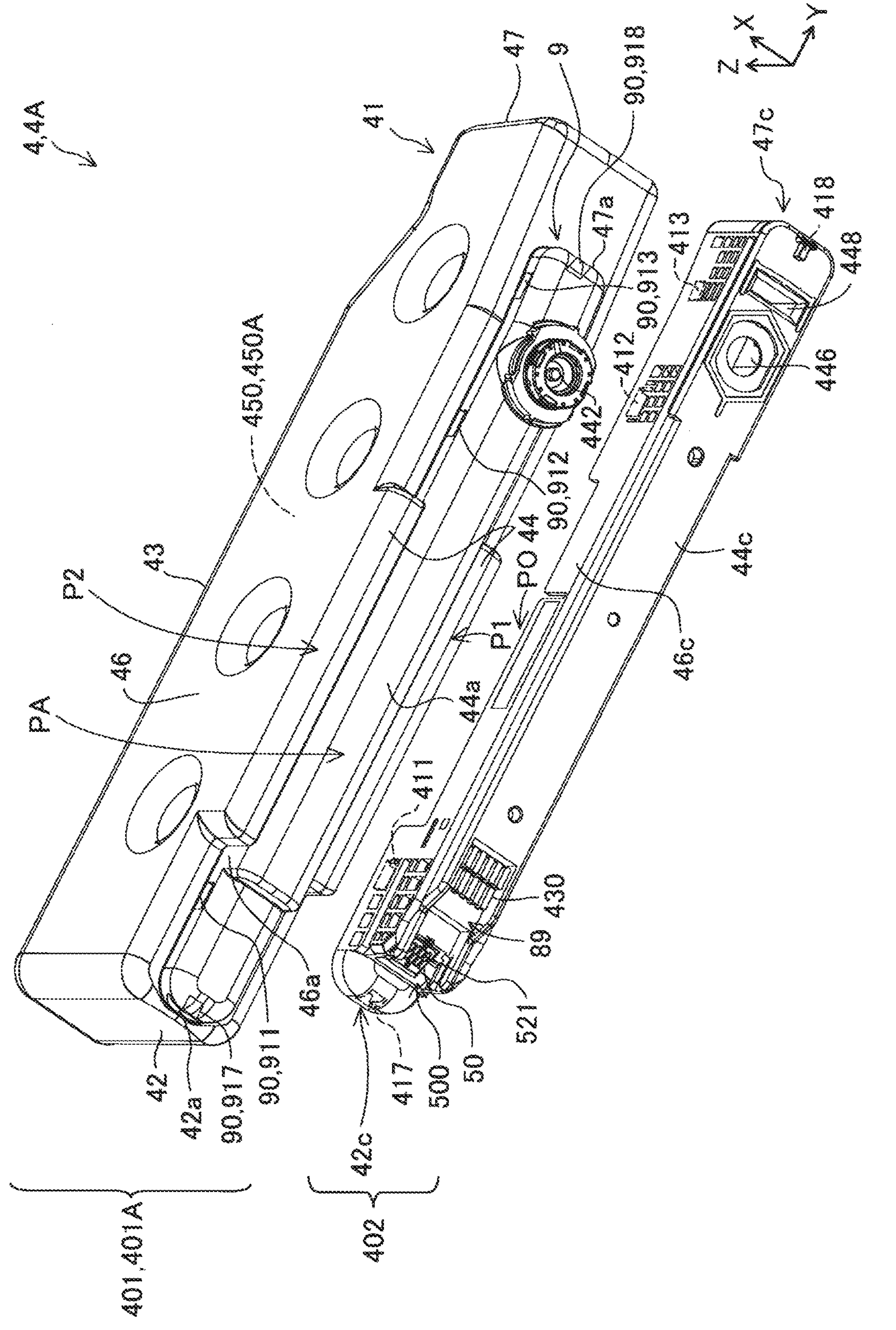
FIG. 14 is a first exploded perspective view of the first cartridge according to the first embodiment.
Figure 15:
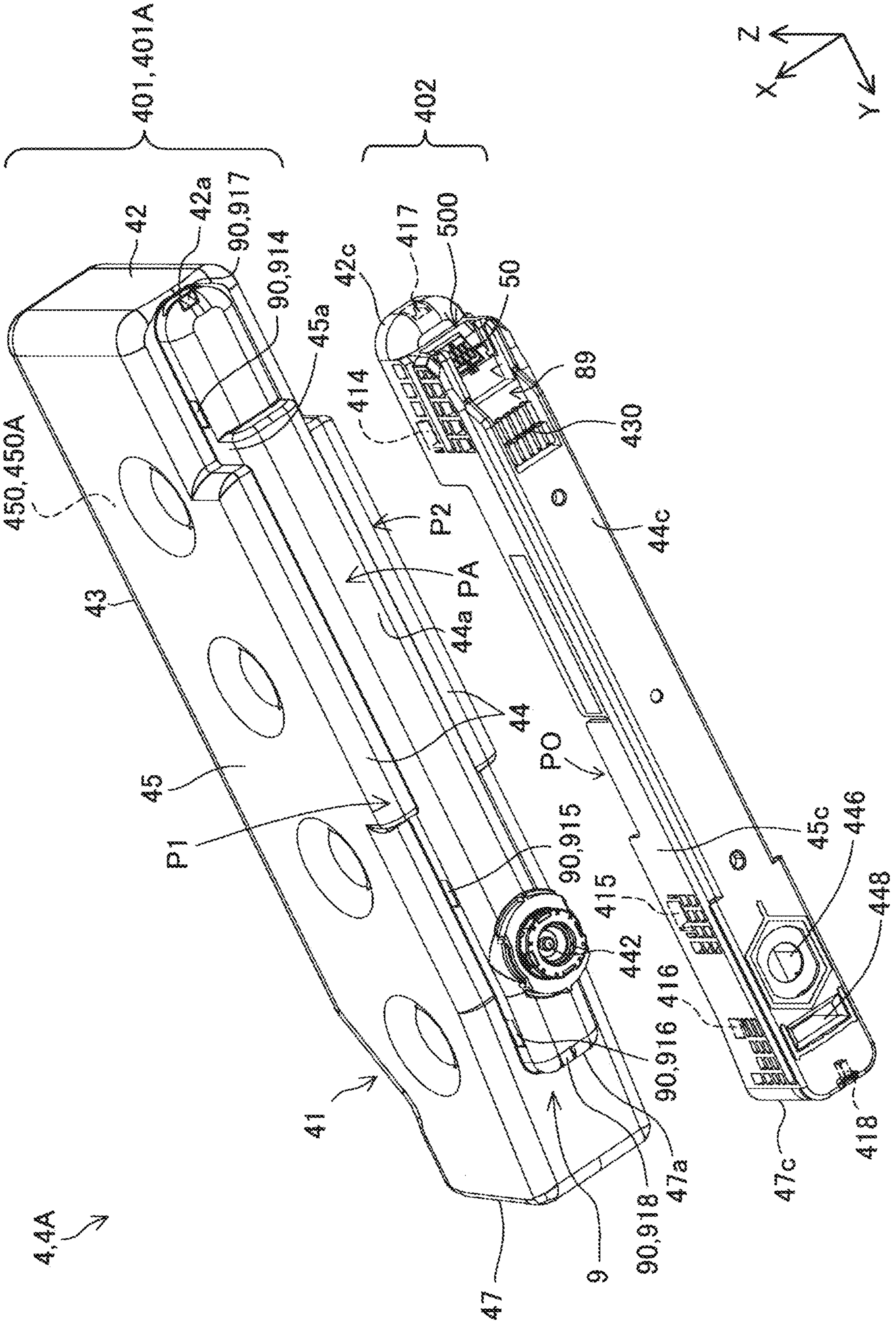
FIG. 15 is a second exploded perspective view of the first cartridge according to the first embodiment.
Figure 16:
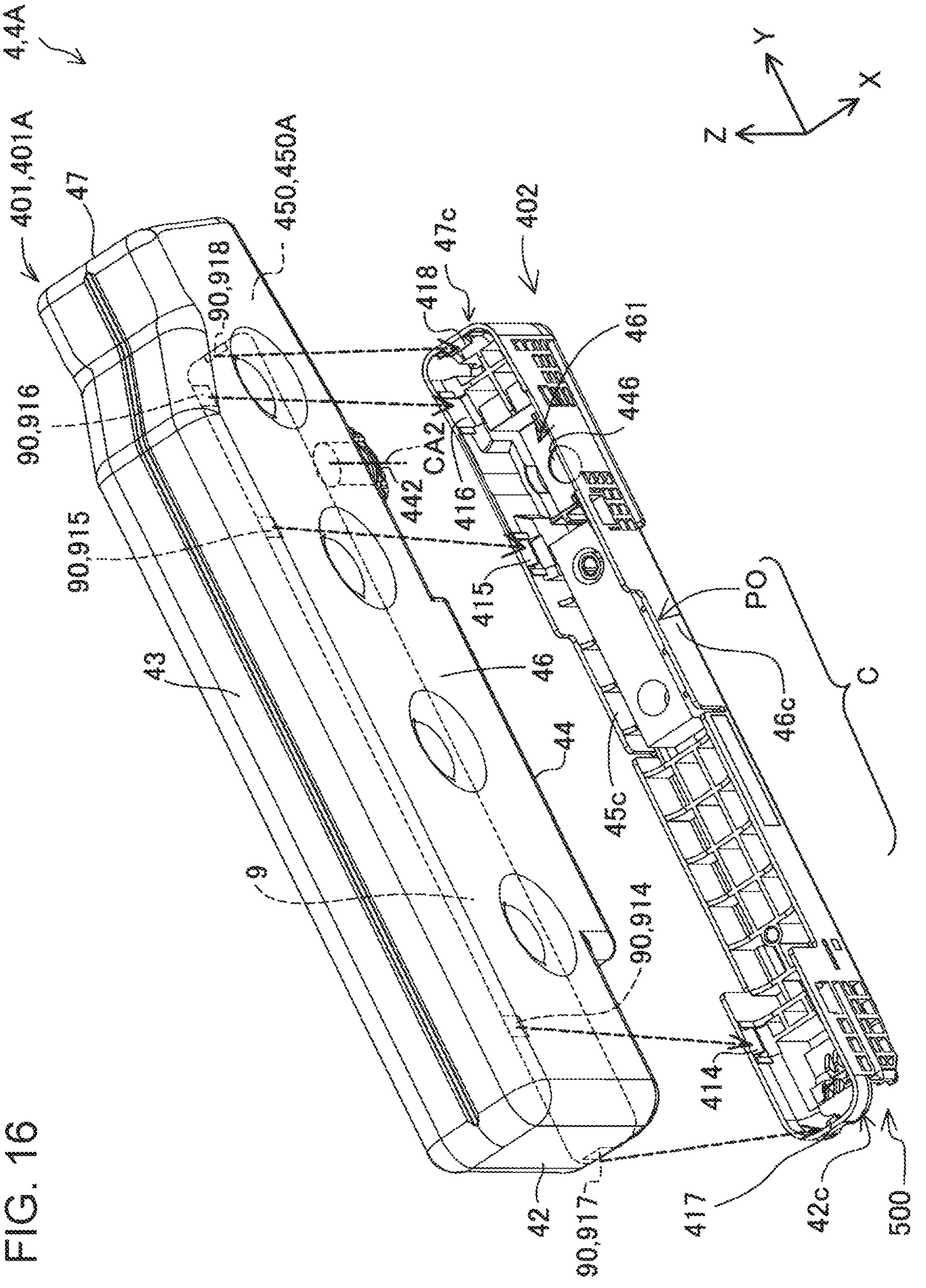
FIG. 16 is a third exploded perspective view of the first cartridge according to the first embodiment.
Figure 17:
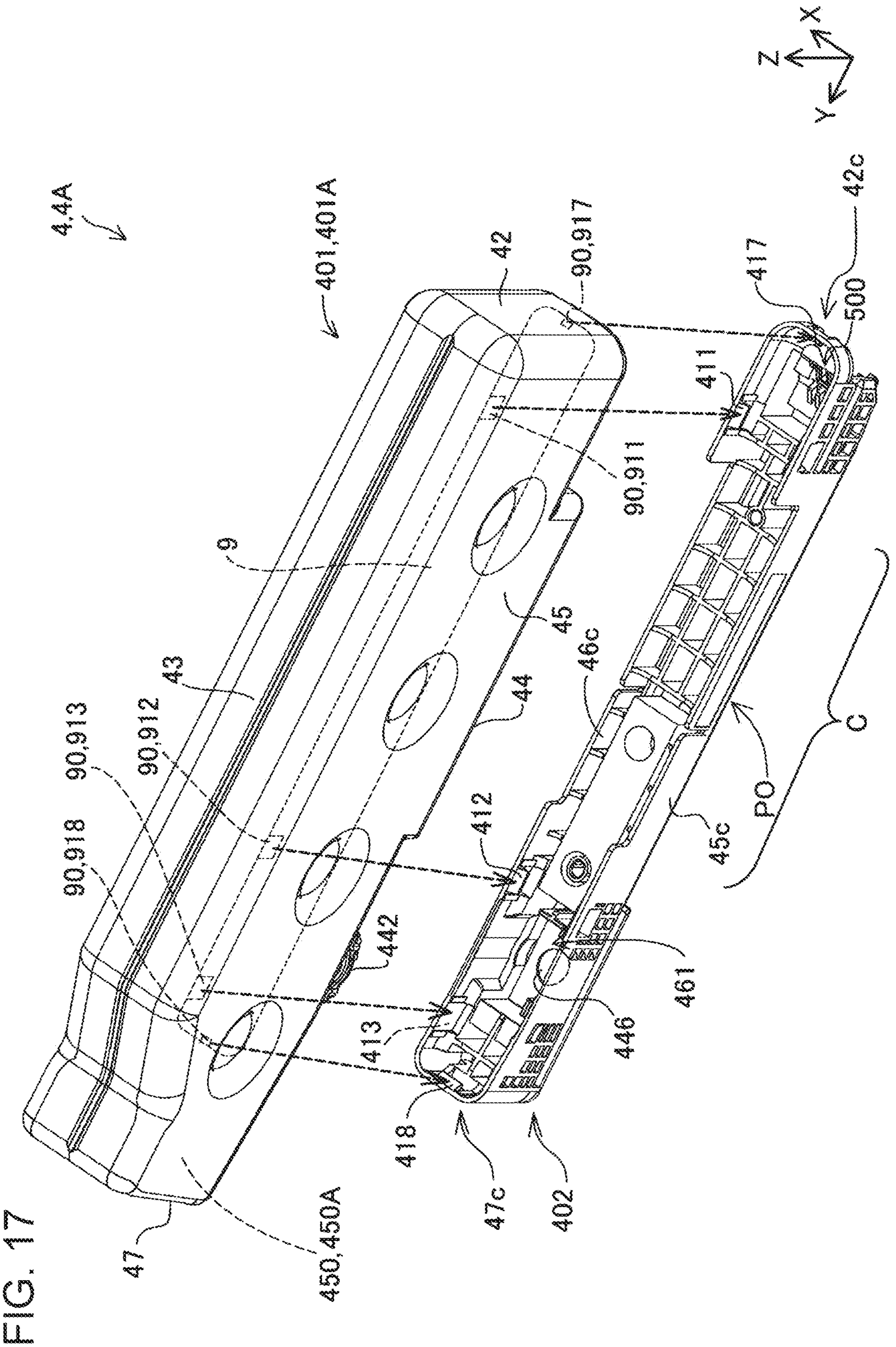
FIG. 17 is a fourth exploded perspective view of the first cartridge according to the first embodiment.

FIG. 10 is a first exploded view of the first cartridge 4A according to the first embodiment; FIG. 11 is a second exploded view of the first cartridge 4A according to the first embodiment; FIG. 12 is a third exploded view of the first cartridge 4A according to the first embodiment; and FIG. 13 is a fourth exploded view of the first cartridge 4A according to the first embodiment. FIG. 14 is a first exploded perspective view of the first cartridge 4A according to the first embodiment; FIG. 15 is a second exploded perspective view of the first cartridge 4A according to the first embodiment; FIG. 16 is a third exploded perspective view of the first cartridge 4A according to the first embodiment; and FIG. 17 is a fourth exploded perspective view of the first cartridge 4A according to the first embodiment. Hereinafter, the −Z-directional-side surface of the first cartridge 4A which is parallel to the X-Y plane is referred to as the bottom surface, and the +Z-directional-side surface of the first cartridge 4A which is parallel to the X-Y plane is referred to as the top surface.

In this embodiment, the insertion direction D1 of a cartridge 4 may be identical to the −Y direction, whereas the de-insertion direction of the cartridge 4 may be identical to the +Y direction. In this embodiment, the depth direction of the cartridge 4 may be identical to the +Y direction, the height direction of the cartridge 4 may be identical to the +Z direction, and the width direction of the cartridge 4 may be identical to the +X direction. The first cartridge 4A, which is one of the cartridges 4, can contain a large amount of liquid and thus has the largest outer body than that of any other cartridge 4 such as the second cartridge 4B. In this embodiment, the lengths of the cartridge 4 along the X-, Z-, and Y-axes are larger in this order. In the drawings, the lengths, along the X-, Y-, and Z-axes, of the cartridge 4 that has been subjected to the terminal connecting subprocess, in which the cartridge 4 is inserted into the cartridge attachment 4, will be defined as reference lengths. In other words, the lengths, along the X-, Y-, and X-axes, of the cartridge 4 that has not yet been subjected to the supply section coupling subprocess, in which the support member 610 is rotated as illustrated in FIG. 6, will be defined as the reference lengths.

As illustrated in FIG. 10, the first cartridge 4A includes a liquid container 401 and an adaptor 402. By mounting the adaptor 402 onto the liquid container 401, the first cartridge 4A is made attachable to the cartridge attachment 6 (see FIG. 8). As an example, each of the liquid container 401 and the adaptor 402 is made of a synthetic resin. Further, both the liquid container 401 and the adaptor 402 may be made of either the same material or different materials. In addition, the liquid container 401 may be lighter than the adaptor 402 in terms of the handleability of the cartridge 4.

As illustrated in FIG. 10, the liquid container 401 includes: a main body 41 that forms the outer shell; the liquid storage 450; the liquid supply section 442; and an adaptor mounting section 9. Hereinafter, the liquid container 401 of the first cartridge 4A is referred to as a first liquid container 401A, and the liquid container 401 of the second cartridge 4B is referred to as a second liquid container 401B. In addition, the liquid storage 450 of the first cartridge 4A is referred to as a first liquid storage 450A, and the liquid storage 450 of the second cartridge 4B is referred to as a second liquid storage 450B.

As illustrated in FIGS. 14 and 15, the main body 41 of the first liquid container 401A has a front wall 42, a rear wall 47, a top wall 43, a bottom wall 44, a first sidewall 45, and a second sidewall 46. The front wall 42, the rear wall 47, the top wall 43, the bottom wall 44, the first sidewall 45, and the second sidewall 46 are sometimes referred to, respectively, as the front surface 42, the rear surface 47, the top surface 43, the bottom surface 44, the first side surface 45, and the second side surface 46. The rear wall 47 faces the front wall 42 in the insertion direction D1, or in the −Y direction; the bottom wall 44 faces the top wall 43 in the height direction, or in the +Z direction; and the second sidewall 46 faces the first sidewall 45 in the width direction, or in the +X direction. In this case, the ±X directions, the ±Y directions, and ±X directions are orthogonal to one another.

The front wall 42 is positioned on the downstream side of the main body 41 in the insertion direction D1, in which the cartridge 4 is inserted into the cartridge attachment 6. In short, the front wall 42 forms the insertional end of the main body 41 which is positioned on the downstream side in the insertion direction D1, or in the −Y direction (see FIG. 2). The top wall 43 is positioned on the +Z-directional side of the main body 41 while intersecting both the front wall 42 and the rear wall 47. The bottom wall 44 is positioned on the downstream side of the main body 41 in the direction of gravitational force when the cartridge attachment 6 is in the attached state. In other words, the bottom wall 44 is positioned on the downstream side of the main body 41 in the −Z direction, or in the connection direction D2 (see FIG. 3). In addition, the bottom wall 44 intersects both the front wall 42 and the rear wall 47. The first sidewall 45 is positioned on the −X-directional side of the main body 41, whereas the second sidewall 46 is positioned on the +X-directional side of the main body 41. Each of the first sidewall 45 and the second sidewall 46 intersects the front wall 42, the rear wall 47, the top wall 43, and the bottom wall 44.

As illustrated in FIG. 11, the first liquid container 401A has a central section C at the center in a longitudinal direction thereof, or in the +Y direction. The central section C is provided with a first projection P1, which is formed of a portion of the bottom wall 44 and the first sidewall 45 which protrudes in the −Z direction from any other portion. Likewise, as illustrated in FIG. 10, the central section C is positioned at the center of the first liquid container 401A in the longitudinal direction, or in the +Y direction, and provided with a second projection P2, which is formed of a portion of the bottom wall 44 and the second sidewall 46 which protrudes in the −Z direction from any other portion.

As illustrated in FIGS. 14 and 15, the adaptor mounting section 9 is formed to protrude from the bottom wall 44 toward the adaptor 402, or toward the −Z-directional side. The adaptor mounting section 9 includes a mounting front wall 42*a*, a mounting bottom wall 44*a*, a first mounting sidewall 45*a*, a second mounting sidewall 46*a*, and a mounting rear wall 47*a*. The mounting rear wall 47*a* faces the mounting front wall 42*a* in the insertion direction D1, or in the −Y direction. The mounting bottom wall 44*a* faces the bottom wall 44 in the height direction, or in the +Z direction. The first mounting sidewall 45*a* faces the second mounting sidewall 46*a* in the width direction, or in the +X direction.

The mounting front wall 42*a* is positioned on the downstream side of the adaptor mounting section 9 in the insertion direction D1, in which the cartridge 4 is inserted into the cartridge attachment 6, or in the −Y direction. The mounting rear wall 47*a* forms a surface of the adaptor mounting section 9 which is positioned on the downstream side in the de-insertion direction, or in the +Y direction. Each of the mounting front wall 42*a* and the mounting rear wall 47*a* intersects the bottom wall 44 of the main body 41. The mounting bottom wall 44*a* is positioned on the downstream side of the adaptor mounting section 9 in the direction of gravitational force, or in the −Z direction when the cartridge attachment 6 is in the attached state. In other words, the mounting bottom wall 44*a* is positioned on the downstream side of the adaptor mounting section 9 in the connection direction D2 (see FIG. 3). In addition, the mounting bottom wall 44*a* intersects both the mounting front wall 42*a* and the mounting rear wall 47*a*. The first mounting sidewall 45*a* is positioned on the −X-directional side of the adaptor mounting section 9, whereas the second mounting sidewall 46*a* is positioned on the +X-directional side of the adaptor mounting section 9. Each of the first mounting sidewall 45*a* and the second mounting sidewall 46*a* intersects the bottom wall 44, the mounting front wall 42*a*, the mounting rear wall 47*a*, and the mounting bottom wall 44*a* of the main body 41. Hereinafter, the portion of the adaptor mounting section 9 between the first projection P1 and the second projection P2 in the width direction of the cartridge 4, or in the +X direction, is referred to as a mounting central section PA.

As illustrated in FIGS. 14 and 15, the adaptor mounting section 9 further includes a mounting mechanism 90 having a predetermined constant structure on which the adaptor 402 is to be mounted. The mounting mechanisms 90 of the first cartridge 4A and the second cartridge 4B may have substantially the same configuration. In this embodiment, the mounting mechanism. 90 may be formed of eight container-side engagement sections formed in a predetermined positional relationship that is independent of the type of the cartridge 4. The container-side engagement sections of the mounting mechanism 90 include a first container-side engagement section 911, a second container-side engagement section 912, a third container-side engagement section 913, a fourth container-side engagement section 914, a fifth container-side engagement section 915, a sixth container-side engagement section 916, a seventh container-side engagement section 917, and an eighth container-side engagement section 918. The first container-side engagement section 911 may be a projection to engage with a first adaptor-side engagement section 411 (described later). Likewise, the second container-side engagement section 912 may be a projection to engage with a second adaptor-side engagement section 412 (described later); the third container-side engagement section 913 may be a projection to engage with a third adaptor-side engagement section 413 (described later); the fourth container-side engagement section 914 may be a projection to engage with a fourth adaptor-side engagement section 414 (described later); the fifth container-side engagement section 915 may be a projection to engage with a fifth adaptor-side engagement section 415 (described later); the sixth container-side engagement section 916 may be a projection to engage with a sixth adaptor-side engagement section 416 (described later); the seventh container-side engagement section 917 may be a projection to engage with a seventh adaptor-side engagement section 417 (described later); and the eighth container-side engagement section 918 be a projection to engage with an eighth adaptor-side engagement section 418 (described later). Each of the projections of the first container-side engagement section 911 to the eighth container-side engagement section 918 may be provided with a reverse member. Hereinafter, the state where the adaptor 402 is mounted on the adaptor mounting section 9 is referred to as the mounted state.

In this embodiment, as illustrated in FIG. 10, the first container-side engagement section 911, the second container-side engagement section 912, and the third container-side engagement section 913 are formed on the second mounting sidewall 46*a* at different locations. More specifically, the first container-side engagement section 911, the second container-side engagement section 912, and the third container-side engagement section 913 are formed on the second mounting sidewall 46*a* in this order from the −Y-directional side to the +Y-directional side. In this embodiment, the first container-side engagement section 911 is positioned on the mounting front wall 42*a* side, or on the −Y-directional side, with respect to the mounting central section PA of the adaptor mounting section 9. Also, it can be said that the first container-side engagement section 911 is positioned opposite a terminal placement section 500 formed on the −Y-directional side of the adaptor 402 when the adaptor 402 is mounted on the adaptor mounting section 9, namely, is in the mounted state. Both of the second container-side engagement section 912 and the third container-side engagement section 913 are positioned on the mounting rear wall 47*a* side, or on the +Y-directional side, with respect to the mounting central section PA of the adaptor mounting section 9. Also, it can be said that both the second container side engagement section 912 and the third container-side engagement section 913 are positioned on the liquid supply section 442 side, or on the opposite side of the first container-side engagement section 911 in the +Y direction. In this embodiment, no container-side engagement sections may be formed in the mounting central section PA of the second mounting sidewall 46*a* which is positioned on the −Y-directional side of the adaptor mounting section 9.

In this embodiment, as illustrated in FIG. 11, the fourth container-side engagement section 914, the fifth container-side engagement section 915, and the sixth container-side engagement section 916 are formed on the first mounting sidewall 45*a* at different locations. More specifically, the fourth container-side engagement section 914, the fifth container-side engagement section 915, and the sixth container-side engagement section 916 are formed on the first mounting sidewall 45*a* in this order from the −Y-directional side to the +Y-directional side. In this embodiment, the fourth container-side engagement section 914 is positioned on the mounting front wall 42*a* side, or on the −Y-directional side, with respect to the mounting central section PA of the adaptor mounting section 9. Also, it can be said that the fourth container-side engagement section 914 is positioned opposite the terminal placement section 500 of the adaptor 402 when the adaptor 402 is in the mounted state. Both of the fifth container-side engagement section 915 and the sixth container-side engagement section 916 are positioned on the mounting rear wall 47*a* side, or on the +Y-directional side, with respect to the mounting central section PA of the adaptor mounting section 9. Also, it can be said that both the fifth container-side engagement section 915 and the sixth container-side engagement section 916 are positioned on the liquid supply section 442 side. In this embodiment, no container-side engagement sections may be formed in the mounting central section PA of the adaptor mounting section 9 on the first mounting sidewall 45*a*.

In this embodiment, as illustrated in FIG. 14, the seventh container-side engagement section 917 is positioned on the main body 41 at the intersection of the mounting front wall 42*a* and the mounting bottom wall 44*a*. Also, it can be said that the seventh container-side engagement section 917 is positioned opposite the terminal placement section 500 of the adaptor 402 when the adaptor 402 is in the mounted state.

In this embodiment, as illustrated in FIG. 15, the eighth container-side engagement section 918 positioned on the main body 41 at the intersection of the mounting bottom wall 44*a* and the mounting rear wall 47*a*. Also, it can be said that the eighth container-side engagement section 918 is positioned on the liquid supply section 442 side. It should be noted that the locations, number, and shapes of the container-side engagement sections are not limited to the above. Alternatively, the adaptor mounting section 9 only has to be provided with at least one of the first container-side engagement section 911 to the eighth container-side engagement section 918. An aspect of mounting the adaptor 402 onto the adaptor mounting section 9 will be described later.

The first liquid storage 450A is formed of the front wall 42, the top wall 43, the bottom wall 44, the first sidewall 45, the second sidewall 46, and the rear wall 47 of the main body 41 in the first liquid container 401A.

As illustrated in FIG. 16, the liquid supply section 442 communicates with the interior of the first liquid storage 450A and extends along the central axis CA2, which is inclined with respect to the Z-axis. A direction on the central axis CA2 along which the liquid supply section 442 extends intersects the insertion direction D1, or the −Y direction. The liquid supply section 442 thus extends in a direction intersecting the insertion direction D1. In this embodiment, the liquid supply section 442 may extend in the −Z direction to penetrate the adaptor mounting section 9. The liquid supply section 442 is disposed inside a supply-section placement chamber 461 (described later), which is depressed in the adaptor 402.

The liquid supply section 442 has an internal passage (not illustrated) through which the liquid in the first liquid storage 450A flows to the liquid introduction section 642 (see FIG. 6) disposed outside the first liquid storage 450A. The +Z-directional end of the liquid supply section 442 is coupled to the bottom wall 44 of the first liquid container 401A, whereas the −Z-directional end of the liquid supply section 442 is exposed to the outside. The internal passage of the liquid supply section 442 may be provided with a valve mechanism (not illustrated) that opens or closes the internal passage. The valve mechanism includes a seat, a valve body, and a biasing member, which are arranged in this order from the end of the liquid supply section 442. The seat is formed of a ring member, which may be made of rubber or an elastomer; the valve body is formed of a columnar member that covers a hole formed across the seat; and the biasing member is formed of a coil spring that biases the valve body toward the seat. When the cartridge 4 is in the attached state, the liquid introduction section 642 (see FIG. 6) pushes the valve body in such a way that the valve body moves away from the seat, thereby opening the valve mechanism.

The adaptor 402 serves as a coupling member having a mechanism for electrically connecting and physically coupling the liquid container 401 to the printing apparatus 10. As illustrated in FIGS. 14 and 16, the adaptor 402 includes the cartridge-side identification member 430, the supply-section positioning unit 448, the terminal placement section 500, the supply-section placement chamber 461, an insertion aperture 446, and the first adaptor-side engagement section 411 to the eighth adaptor-side engagement section 418. In this embodiment, the adaptor 402 may include eight adaptor-side engagement sections.

As illustrated in FIGS. 16 and 17, the adaptor 402 is depressed toward the −Z-directional side to receive the adaptor mounting section 9 and is opened on the +Z-directional side, which faces the adaptor mounting section 9. As illustrated in FIGS. 14 and 16, the adaptor 402 has an adaptor front wall 42*c*, an adaptor bottom wall 44*c*, an adaptor first sidewall 45*c*, an adaptor second sidewall 46*c*, and an adaptor rear wall 47*c*. The depressed shape of the adaptor 402 is formed by the adaptor front wall 42*c*, the adaptor bottom wall 44*c*, the adaptor first sidewall 45*c*, the adaptor second sidewall 46*c*, and the adaptor rear wall 47*c*. Hereinafter, when the cartridge 4A is in the attached state, of each of the adaptor front wall 42*c*, the adaptor bottom wall 44*c*, the adaptor first sidewall 45*c*, the adaptor second sidewall 46*c*, and the adaptor rear wall 47*c*, the surface facing the storage chamber 61 of the cartridge attachment 6 is referred to as the outer surface, and the opposite surface is referred to as the inner surface.

The adaptor rear wall 47*c* faces the adaptor front wall 42*c* in the insertion direction D1, or in the −Y direction. When the adaptor 402 is in the mounted state, the adaptor bottom wall 44*c* faces both the bottom wall 44 of the liquid container 401 and the mounting bottom wall 44*a* of the adaptor mounting section 9 in the height direction, or in the +Z direction. The adaptor first sidewall 45*c* faces the adaptor second sidewall 46*c* in the width direction, or in the +X direction.

The adaptor front wall 42*c* is positioned on the downstream side of the adaptor 402 in the insertion direction D1, in which the cartridge 4 is inserted into the cartridge attachment 6, or in the −Y direction. The adaptor rear wall 47*c* forms the surface of the adaptor 402 on the downstream side in the de-insertion direction, or in the +Y direction. When the first cartridge 4A is in the attached state, the adaptor bottom wall 44*c* is positioned on the downstream side of the adaptor 402 in the direction of gravitational force, or in the −Z direction. In other words, the adaptor bottom wall 44*c* is positioned on the downstream side of the adaptor 402 in the connection direction D2 (see FIG. 3). The adaptor bottom wall 44*c* intersects both the adaptor front wall 42*c* and the adaptor rear wall 47*c*. The adaptor first sidewall 45*c* is positioned on the −X-directional side of the adaptor 402, on which the first sidewall 45 and the first mounting sidewall 45*a* are also positioned. The adaptor first sidewall 45*c* is depressed in conformity with the shape of the first projection P1 formed in the central section C, which is positioned at the center of the first liquid container 401A in the longitudinal direction, so that the adaptor first sidewall 45*c* can receive the first projection P1 when the adaptor 402 is in the mounted state. Likewise, the adaptor second sidewall 46*c* is positioned on the +X-directional side of the adaptor 402, on which the second sidewall 46 and the second mounting sidewall 46*a* are also positioned. The adaptor second sidewall 46*c* is depressed in conformity with the shape of the second projection P2 formed at the central section C, which is positioned at the center of the first liquid container 401A in the longitudinal direction, so that the adaptor second sidewall 46*c* can receive the second projection P2 when the cartridge 4 is in the mounted state. Hereinafter, the portion of the adaptor 402 which receives the first projection P1, the second projection P2, and the mounting central section PA is referred to an adaptor central section PO. The adaptor central section PO is positioned in the central section C, which is disposed at the center of the first liquid container 401A in the longitudinal direction. Each of the adaptor first sidewall 45*c* and the adaptor second sidewall 46*c* intersects the adaptor front wall 42*c*, the adaptor bottom wall 44*c*, and the adaptor rear wall 47*c*.

As illustrated in FIGS. 14 and 15, the cartridge-side identification member 430 is formed on the outer surface of the adaptor bottom wall 44*c* and close to the adaptor front wall 42*c*. In this embodiment, the cartridge-side identification member 430 may be positioned adjacent to a corner 89 at which the outer surfaces of the adaptor front wall 42*c* and adaptor bottom wall 44*c* intersect each other. The supply-section positioning unit 448 is positioned on the outer surface of the adaptor bottom wall 44*c* and close to the adaptor rear wall 47*c*. The supply-section positioning unit 448 is depressed from the outer surface to the inner surface of the adaptor bottom wall 44*c*. It should be noted that the cartridge-side identification member 430 and the supply-section positioning unit 448 may be options, and the locations, shapes, and numbers of the cartridge-side identification member 430 and the supply-section positioning unit 448 are not limited to the above.

As illustrated in FIG. 14, the terminal placement section 500 is disposed at the corner 89 and formed of the circuit board 50. The circuit board 50 includes: a plurality of cartridge-side terminals 521 arranged on its first surface (see FIG. 14); and a memory device 525 (see FIG. 7) mounted on its second surface, which is opposite to the first surface. By bringing the apparatus-side terminals 721 into contact with the respective cartridge-side terminals 521, the electrical connection therebetween is established. The cartridge-side terminals 521 are electrically connected to the memory device 525 via the wires. In this embodiment, nine cartridge-side terminals 521 may be mounted. The cartridge-side terminals 521 may be made of a metal material. The surface of the circuit board 50 on which the cartridge-side terminals 521 are arranged is inclined with respect to the straight line extending in the insertion direction D1. More specifically, both surfaces of the circuit board 50 are inclined with respect to the straight line extending in the insertion direction D1 while oriented in directions containing the ±Z-directional components. The memory device 525 stores information regarding the cartridges 4, such as the ink colors and the remaining amounts of the inks therein.

As illustrated in FIGS. 16 and 17, the supply-section placement chamber 461 is the space formed to accommodate the liquid supply section 442 when the adaptor 402 is in the mounted state. The supply-section placement chamber 461 is formed on the upstream side of the adaptor 402 in the insertion direction D1, or in the −Y direction, namely, in the portion of the adaptor 402 surrounded by the adaptor bottom wall 44*c*, the adaptor first sidewall 45*c*, and the adaptor second sidewall 46*c*. Also, it can be said that the supply-section placement chamber 461 is formed on the inner surface of the adaptor 402 and positioned on the +Z-directional side of the insertion aperture 446, on which the adaptor mounting section 9 is also positioned.

As illustrated in FIG. 16, the insertion aperture 446 is a hole formed to pass through both the inner and outer surfaces of the adaptor bottom wall 44*c*. In addition, the insertion aperture 446 is formed on the adaptor bottom wall 44*c* at the location where the supply-section placement chamber 461 is formed. In this embodiment, the insertion aperture 446 may be positioned on the adaptor bottom wall 44*c* and close to the adaptor rear wall 47*c*. When the adaptor 402 is in the mounted state, a portion of the liquid supply section 442 is disposed inside the insertion aperture 446. In addition, the liquid supply section 442 is disposed such that the central axis CA2 of the liquid supply section 442 passes through the insertion aperture 446. During the process of attaching the cartridge 4 to the cartridge attachment 6, the liquid introduction section 642 of the cartridge detachment 6 is inserted into the insertion aperture 446. Both of the insertion aperture 446 and the liquid supply section 442 are positioned within the region, in the insertion direction D1 or the −Y direction, between the rear wall 47 and the central section C, which is positioned at the center of the first liquid container 401A in the longitudinal direction.

The first adaptor-side engagement section 411 to the eighth adaptor-side engagement section 418 serve as mechanisms for engaging with, respectively, the first container-side engagement section 911 to the eighth container-side engagement section 918 disposed in the first liquid container 401A. In this embodiment, as illustrated in FIGS. 16 and 17, the eight adaptor-side engagement sections are disposed in the adaptor 402. More specifically, the first adaptor-side engagement section 411, the second adaptor-side engagement section 412, the third adaptor-side engagement section 413, the fourth adaptor-side engagement section 414, the fifth adaptor-side engagement section 415, and the sixth adaptor-side engagement section 416 are disposed in the adaptor 402. Furthermore, the seventh adaptor-side engagement section 417 and the eighth adaptor-side engagement section 418 are also disposed in the adaptor 402. The first adaptor-side engagement section 411 to the eighth adaptor-side engagement section 418 are formed of recesses that receive, respectively, the projections of the first container-side engagement section 911 to the eighth container-side engagement section 918. In this embodiment, the first adaptor-side engagement section 411 to the eighth adaptor-side engagement section 418 may be depressed to receive, respectively, the projections of the first container-side engagement section 911 to the eighth container-side engagement section 918.

As illustrated in FIG. 17, the first adaptor-side engagement section 411, the second adaptor-side engagement section 412, and the third adaptor-side engagement section 413 are formed on the inner surface of the adaptor second sidewall 46*c*. More specifically, the adaptor 402 is in the mounted state, the first adaptor-side engagement section 411 is positioned to engage with the first container-side engagement section 911, the second adaptor-side engagement section 412 is positioned to engage with the second container-side engagement section 912, and the third adaptor-side engagement section 413 is positioned to engage with the third container-side engagement section 913. In this embodiment, the first adaptor-side engagement section 411 may be positioned on the downstream side in the insertion direction D1, or in the −Y direction, with respect to the adaptor central section PO. Also, it can be said that the first adaptor-side engagement section 411 is positioned on the terminal placement section 500 side, or on the −Y-directional side, with respect to the adaptor central section PO. Both the second adaptor-side engagement section 412 and the third adaptor-side engagement section 413 are positioned on the downstream side in the de-insertion direction, or in the +Y direction, with respect to the adaptor central section PO and arranged in this order from the −Y-directional side to the +Y-directional side. Also, it can be said that both the second adaptor-side engagement section 412 and the third adaptor-side engagement section 413 are positioned on the insertion aperture 446 side, which is an opposite side of the first adaptor-side engagement section 411 side, with respect to the adaptor central section PO in the insertion direction D1, or in the −Y-direction.

As illustrated in FIG. 16, the fourth adaptor-side engagement section 414, the fifth adaptor-side engagement section 415, and the sixth adaptor-side engagement section 416 are formed on the inner surface of the adaptor first sidewall 45*c*. More specifically, when the adaptor 402 is in the mounted state, the fourth adaptor-side engagement section 414 is positioned to engage with the fourth container-side engagement section 914, the fifth adaptor-side engagement section 415 is positioned to engage with the fifth container-side engagement section 915, and the sixth adaptor-side engagement section 416 is positioned to engage with the sixth container-side engagement section 916. In this embodiment, the fourth adaptor-side engagement section 414 may be positioned on the downstream side in the insertion direction D1, or in the −Y direction, with respect to the adaptor central section PO. Also, it can be said that the fourth adaptor-side engagement section 414 is positioned on the terminal placement section 500 side, or on the −Y-directional side, with respect to the adaptor central section PO. Both the fifth adaptor-side engagement section 415 and the sixth adaptor-side engagement section 416 are positioned on the downstream side in the de-insertion direction, or in the +Y direction, with respect to the adaptor central section PO and arranged in this order from the −Y-directional side to the +Y-directional side. Also, it can be said that both the fifth adaptor-side engagement section 415 and the sixth adaptor-side engagement section 416 are positioned on the insertion aperture 446 side, which is an opposite side of the fourth adaptor-side engagement section 414 side, with respect to the adaptor central section PO in the +Y direction. In this embodiment, no adaptor-side engagement sections may be formed in the adaptor central section PO.

As illustrated in FIG. 16, the seventh adaptor-side engagement section 417 is positioned on the inner surface of the adaptor front wall 42*c* to engage with the seventh container-side engagement section 917. Also, it can be said that the seventh adaptor-side engagement section 417 is positioned at the downstream end of the adaptor 402 in the insertion direction D1, or in the −Y-direction.

As illustrated in FIG. 17, the eighth adaptor-side engagement section 418 is positioned on the inner surface of the adaptor rear wall 47*c* to engage with the eighth container-side engagement section 918. Also, it can be said that the eighth adaptor-side engagement section 418 is positioned in the downstream end of the adaptor 402 in the de-insertion direction, or in the +Y direction. The eighth adaptor-side engagement section 418 is positioned on the opposite side of the seventh adaptor-side engagement section 417 in the +Y direction.

A-6. Aspect of Mounting Adaptor onto Adaptor Mounting Section

In this embodiment, the first container-side engagement section 911 to the eighth container-side engagement section 918 constituting the mounting mechanism 90 engage with, respectively, the first adaptor-side engagement section 411 to the eighth adaptor-side engagement section 418 (see FIGS. 10 to 17). In this way, the adaptor 402 is mounted on the adaptor mounting section 9, which is a component disposed in the liquid container 401. More specifically, to mount the adaptor 402 onto the adaptor mounting section 9, a user first places the adaptor 402 close to the liquid container 401 with the adaptor bottom wall 44*c* facing the bottom wall 44. Herein, the direction in which the adaptor 402 moved to the liquid container 401 until the adaptor 402 has entered the mounted state is referred to as the mounting direction, which may be identical to the +Z directions in this embodiment. Then, the user abuts, in the mounting direction, the first adaptor-side engagement section 411 to the eighth adaptor-side engagement section 418, respectively, against the first container-side engagement section 911 to the eighth container-side engagement section 918. Following this, the user inserts the projections of the first container-side engagement section 911 to the eighth container-side engagement section 918, respectively, into the recesses of the first adaptor-side engagement section 411 to the eighth adaptor-side engagement section 418 in the mounting direction. In this way, the first container-side engagement section 911 to the eighth container-side engagement section 918 engage with, respectively, the first adaptor-side engagement section 411 to the eighth adaptor-side engagement section 418, all of which have been placed at corresponding locations. It should be noted that the locations, number, and shapes of the first adaptor-side engagement section 411 to the eighth adaptor-side engagement section 418 are not limited to the above. Alternatively, at least one of the first adaptor-side engagement section 411 to the eighth adaptor-side engagement section 418 may be formed in the adaptor 402 and may engage with a corresponding container-side engagement section in the liquid container 401.

Figure 18:
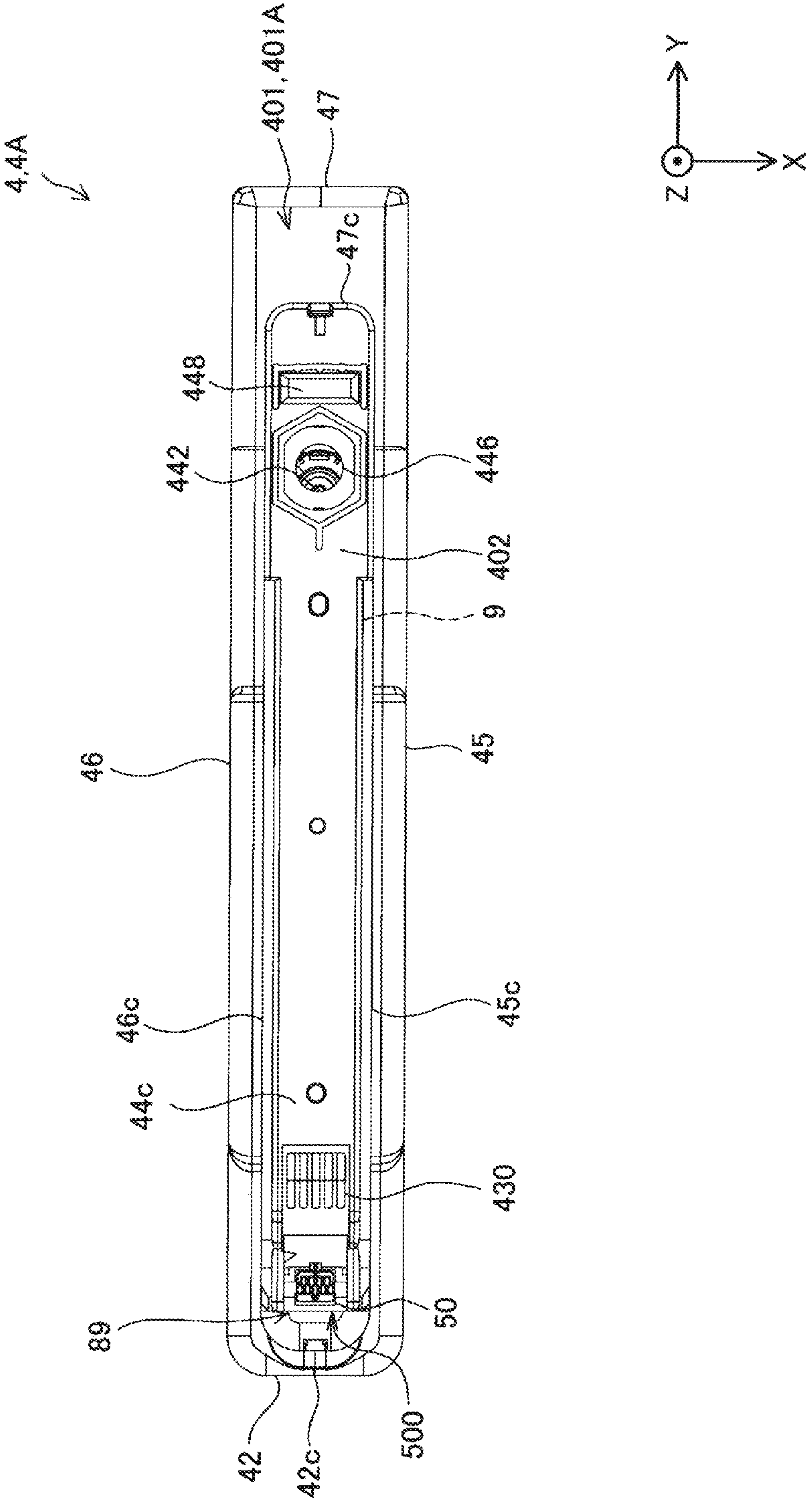
FIG. 18 is a bottom view of the first cartridge.
Figure 19:
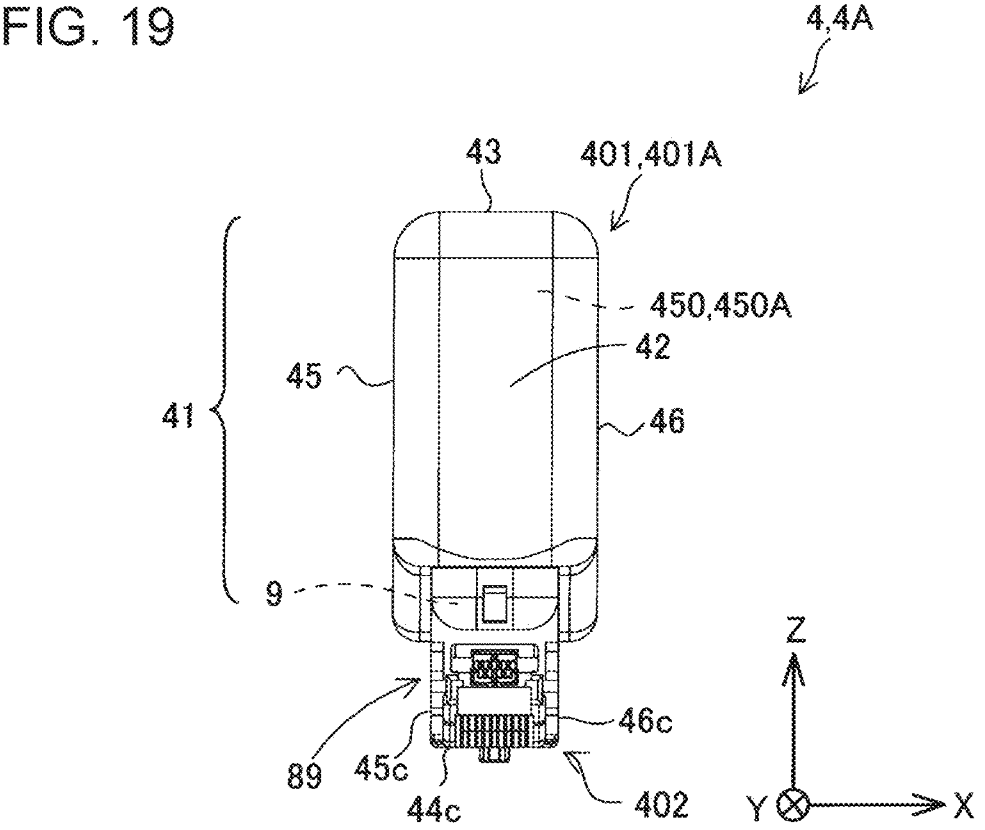
FIG. 19 is a front view of the first cartridge.
Figure 20:
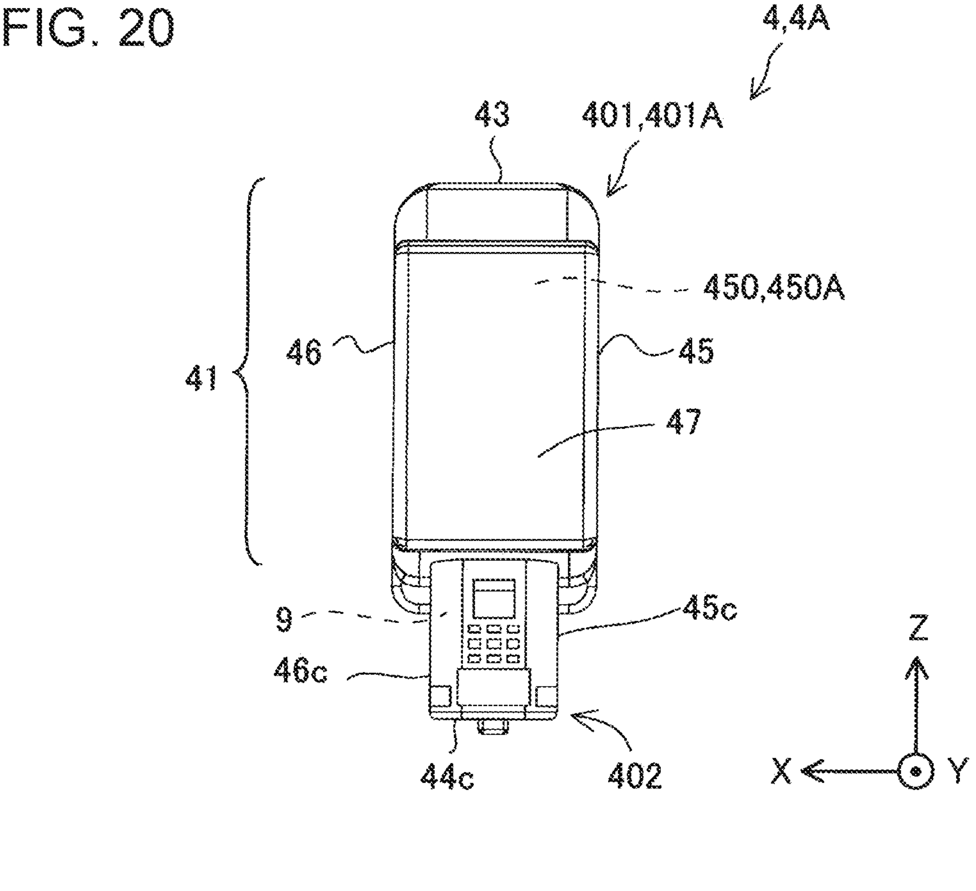
FIG. 20 is a rear view of the first cartridge.

FIG. 18 is a bottom view of the first cartridge 4A; FIG. 19 is a front view of the first cartridge 4A; and FIG. 20 is a rear view of the first cartridge 4A. In this embodiment, the first container-side engagement section 911 to the eighth container-side engagement section 918 may engage with, respectively, the first adaptor-side engagement section 411 to the eighth adaptor-side engagement section 418, thereby mounting the adaptor 402 onto the liquid container 401 to assemble a cartridge 4 as illustrated in FIGS. 18 to 20.

A-7. Detailed Configuration of Second Cartridge

Figure 21:
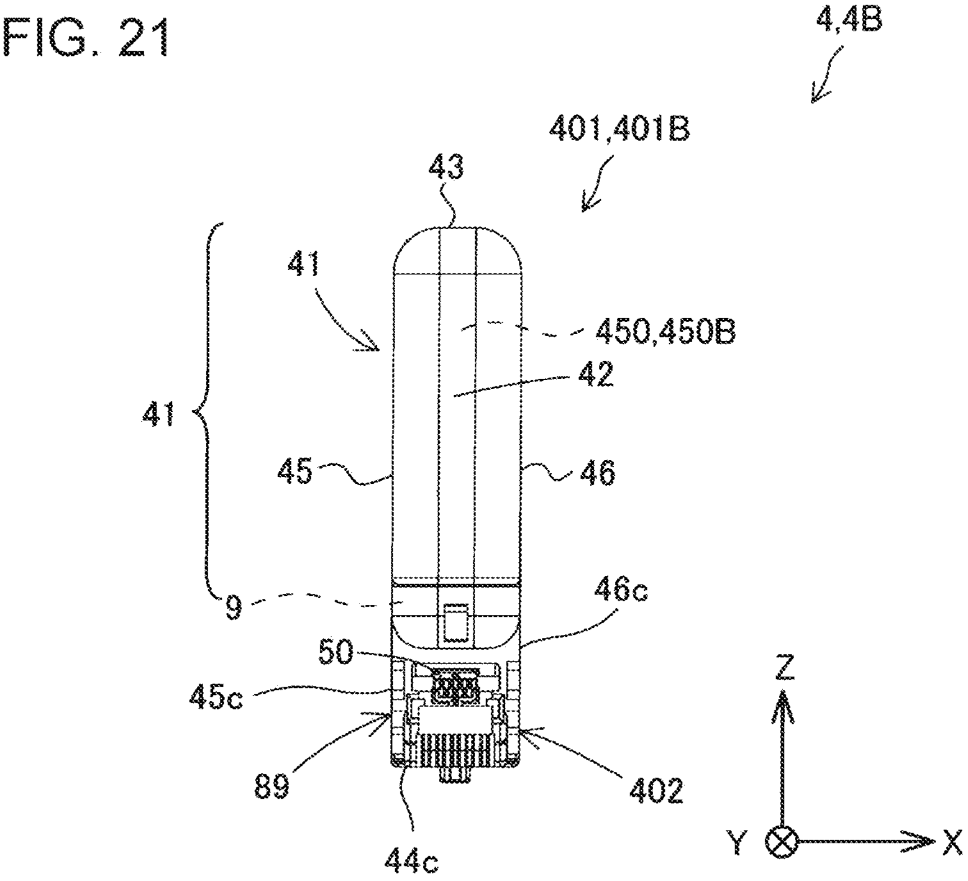
FIG. 21 is a front view of the second cartridge.
Figure 22:
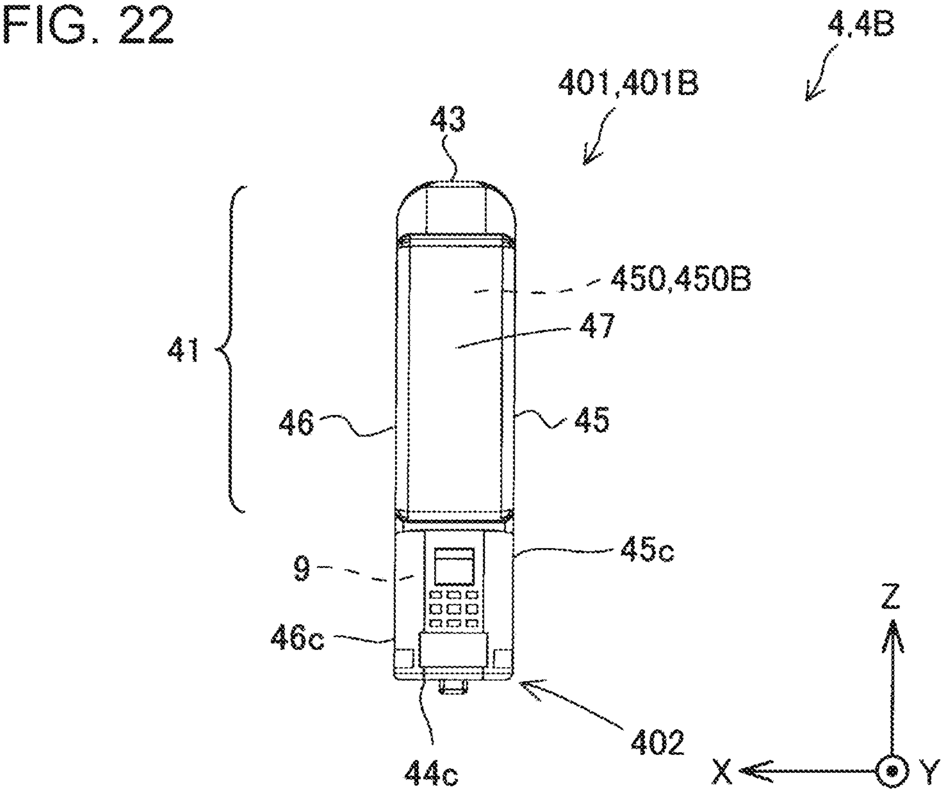
FIG. 22 is a rear view of the second cartridge.

FIG. 21 is a front view of the second cartridge 4B; FIG. 22 is a rear view of the second cartridge 4B. Components of the second cartridge 4B which are substantially the same as those of the first cartridge 4A are given the same alphanumeric characters and will not be described accordingly.

The second liquid storage 450B of the second cartridge 4B differs from the first liquid storage 450A of the first cartridge 4A, in the length of the main body 41 in the width direction. In this embodiment, as illustrated in FIGS. 19 and 21, the length of the second liquid storage 950B in the width direction, or in the +X direction, is shorter than that of the first liquid storage 450A. More specifically, the length of the second liquid storage 450B formed in the second cartridge 4B in the width direction is shorter than that of the first liquid storage 450A formed in the first cartridge 4A. Accordingly, the amount of liquid that can be contained in the second liquid storage 450B is smaller than the amount of liquid that can be contained in the first liquid storage 450A. In other words, the capacity of the second liquid storage 450B is smaller than that of the first liquid storage 450A.

The configuration of the second cartridge 4B is substantially the same as that of the first cartridge 4A, except for the length of the liquid storage 450 in the width direction and the shape of the patterns formed by the cartridge-side identification member 430. Thus, the shapes of the adaptor mounting section 9 and the adaptor 402 in the second cartridge 4B are substantially the same as those in the first cartridge 4A. This means that the same adaptor 402 can be commonly used for both the first cartridge 4A and the second cartridge 4B provided with the liquid storages 450 having different capacities. It is therefore possible to alter the shape of the liquid storage 450 without involving a redesign of the entire cartridge 4 even if the capacity of a liquid storage 450 in an existing cartridge 4 is changed or even if a plurality of cartridges 4 in which respective liquid storages 450 have different capacities are designed.

When the direction orthogonal to the insertion direction D1 is represented by the width direction and the direction orthogonal to both the insertion direction D1 and the width direction is represented by the height direction, the lengths of the first liquid storage 450A and the second liquid storage 450B in the height direction may differ from each other. Even in this case, the same adaptor 402 can also be commonly used for both the cartridges 4A and 4B that include the liquid storages 450 having different capacities.

According to an embodiment, as described above, of the present disclosure, a cartridge 4 includes: a liquid container 401 having a liquid storage 450 and a liquid supply section 442; and an adaptor 402 via which the liquid container 401 is coupled to the printing apparatus 10. Further, the liquid container 401 and the adaptor 402 are formed as independent components. In this case, each of the adaptor mounting section 9 in the liquid container 401 and the adaptor 402 has a predetermined constant shape that is independent of the capacity of the liquid storage 450. In addition, the adaptor 402 is mounted on an adaptor mounting section 9 through a mounting mechanism 90 having a predetermined structure. It is therefore possible to alter the shape of the liquid storage 450 without involving a redesign of the entire cartridge 4 even if the capacity of a liquid storage 450 in an existing cartridge 4 is changed or even if a plurality of cartridges 4 in which respective liquid storages 450 have different capacities are designed. In which case, the redesign of the cartridge 4 can be made in a short time because only a few portions of the cartridge 4 need to be redesigned.

According to an embodiment, as described above, of the present disclosure, even if the capacity of a liquid storage 450 in an existing cartridge 4 is changed or even if a plurality of cartridges 4 in which respective liquid storages 450 have different capacities are designed, it is only necessary to prepare the mold for the liquid storage 450, and it is thus unnecessary to prepare the mold for the entire cartridge 4, which can lead to a reduction in mold costs.

According to an embodiment, as described above, of the present disclosure, a mounting mechanism 90 includes a first container-side engagement section 911 to an eighth container-side engagement section 918 formed in accordance with a predetermined positional relationship. An adaptor 402 includes a terminal placement section 500, a liquid supply section 442, and a first adaptor-side engagement section 411 to an eighth adaptor-side engagement section 418, which are configured to engage with, respectively, the first container-side engagement section 911 to the eighth container-side engagement section 918. By causing the first container-side engagement section 911 to the eighth container-side engagement section 918 to engage with, respectively, the first adaptor-side engagement section 411 to the eighth adaptor-side engagement section 418, the liquid container 401 and the adaptor 402 formed as independent components are made attachable to the cartridge attachment 6. In this case, the adaptor 402 can be fixed to the liquid container 401 at a plurality of locations. It is therefore possible to reduce the risk of the adaptor 402 being accidentally removed from the liquid container 401 when the adaptor 402 is in the mounted state.

According to an embodiment, as described above, of the present disclosure, a liquid container 401 and an adaptor 402 are formed as independent components. An adaptor mounting section 9 of the liquid container 401 and the adaptor 402 each have a predetermined constant shape. By changing the length of a liquid storage 450 of the liquid container 401 in at least one of a width direction and a height direction, the adaptor 402 can be commonly used for the liquid storage 450 even if the capacity of the liquid storage 450 is changed.

According to an embodiment, as described above, of the present disclosure, an adaptor 402 can be commonly used for liquid container 401 independently of the capacity of the liquid storage 450 in the liquid container 401. It is therefore possible to standardize the shape of the adaptor 402, thereby resulting in easy management of the adaptor 402 throughout the production and development stages.

B. Second Embodiment

Figure 23:
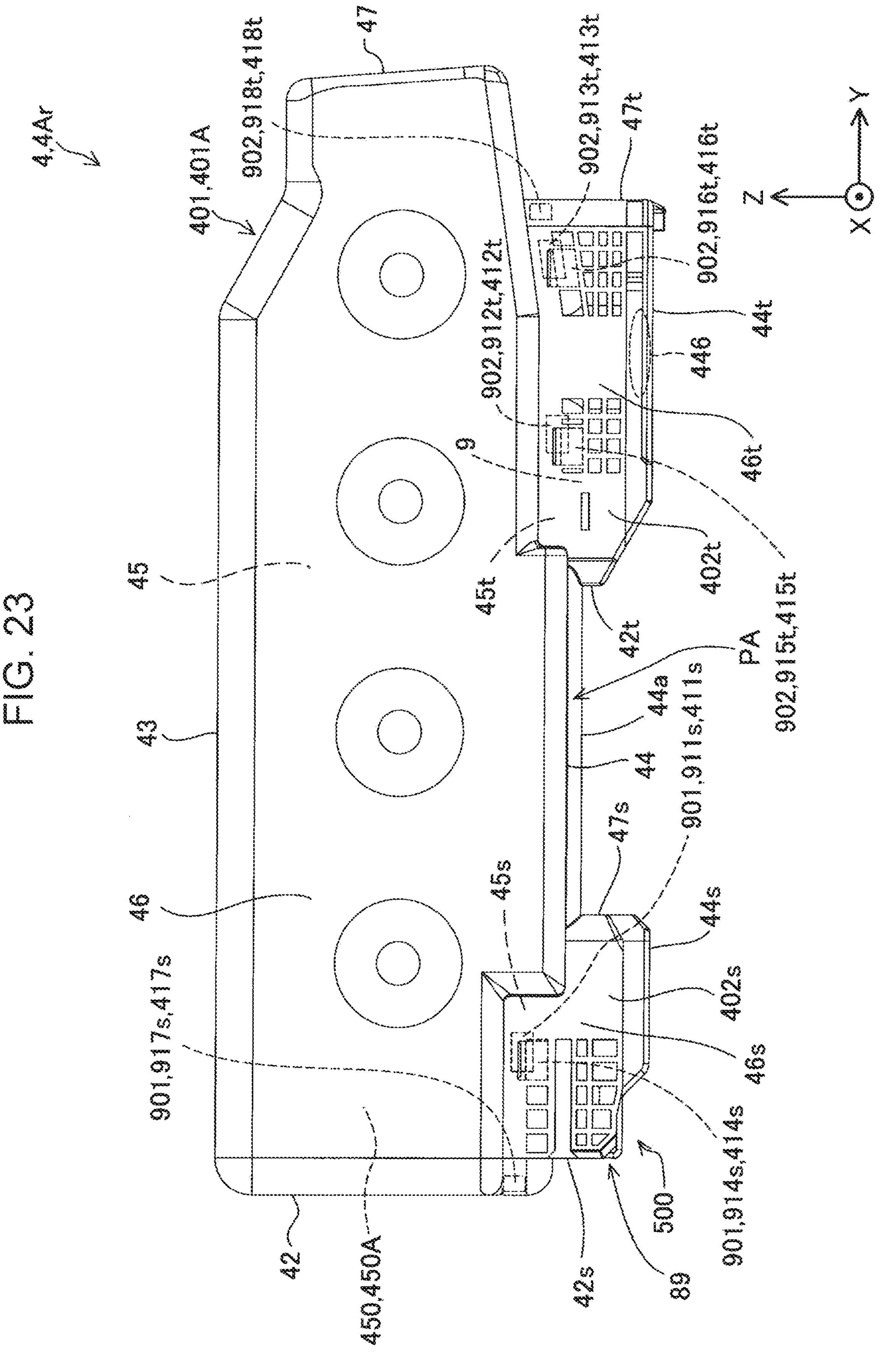
FIG. 23 is a side view of a first cartridge according to a second embodiment of the present disclosure.
Figure 24:
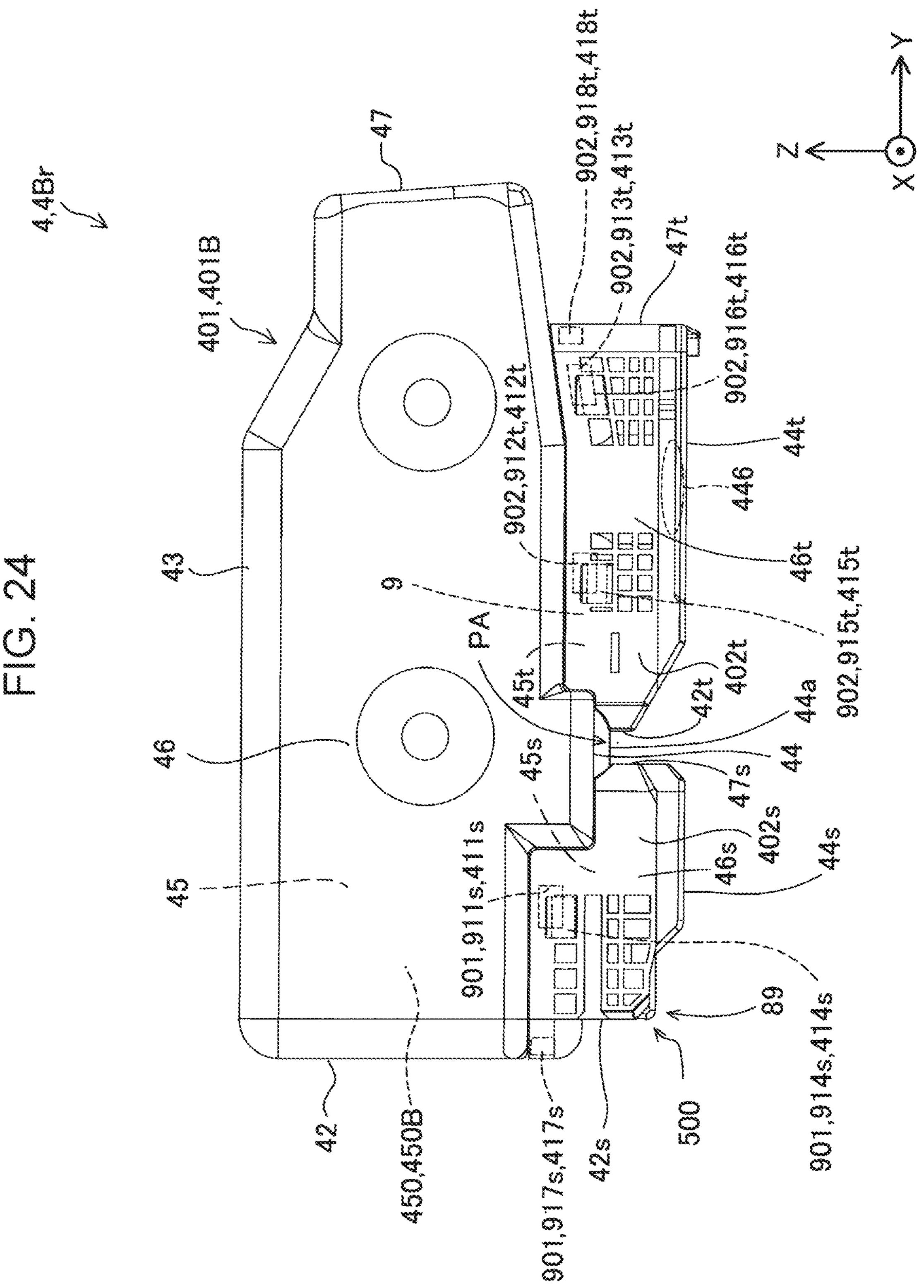
FIG. 24 is a side view of a second cartridge according to the second embodiment.

FIG. 23 is a side view of a first cartridge 4Ar according to a second embodiment of the present disclosure; FIG. 24 is a side view of a second cartridge 4Br according to the second embodiment. The second embodiment differs from the foregoing first embodiment, in the configurations of an adaptor 402 and a first container-side engagement section 911 to an eighth container-side engagement section 918. Other components in the second embodiment, however, have substantially the same the configurations and functions as those in the first embodiment. Those components are thus given the same alphanumeric characters.

In this embodiment, an adaptor 402 includes a first portion 402*s* provided with a terminal placement section 500 and a second portion 402 provided with an insertion aperture 446. The first portion 402*s* and the second portion 402*t* are formed as independent components. The first portion 402*s* is mounted close to the insertion side, or the −Y-directional side, of an adaptor mounting section 9, whereas the second portion 402*t* is mounted close to the +Y-directional side of the adaptor mounting section 9 on which a liquid supply section 442 is formed. Each of the first portion 402*s* and the second portion 402*t* is depressed toward the −Z-directional side and is received by the adaptor mounting section 9 positioned on the +Z-directional side.

The first portion 402*s* is provided with the terminal placement section 500, whereas the second portion 402*t* is provided with a supply-section placement chamber 461 and the insertion aperture 446. The functions of the terminal placement section 500, the supply-section placement chamber 461, and the insertion aperture 446 are substantially the same as those in the foregoing first embodiment. It should be noted that at least one of the first portion 402*s* and the second portion 402*t* may be provided with a cartridge-side identification member 430 and a supply-section positioning unit 448 as illustrated in FIG. 18.

The first portion 402*s* has a first-portion front wall 42*s*, a first-portion bottom wall 44*s*, a first-portion first sidewall 45*s*, a first-portion second sidewall 46*s*, and a first-portion rear wall 47*s*. The depressed shape of the first portion 402*s* is thus formed by the first-portion front wall 42*s*, the first-portion bottom wall 44*s*, the first-portion first sidewall 45*s*, the first-portion second sidewall 46*s*, and the first-portion rear wall 47*s*. Hereinafter, when the first cartridge 4Ar is in the attached state, of each of the first-portion front wall 42*s*, the first-portion bottom wall 44*s*, the first-portion first sidewall 45*s*, the first-portion second sidewall 46*s*, and the first-portion rear wall 47*s*, the surface facing a storage chamber 61 of the cartridge attachment 6 is referred to as the outer surface and the opposite surface is referred to as the inner surface.

The first-portion rear wall 47*s* faces the first-portion front wall 42*s* in the insertion direction D1, or in the −Y direction. When the first portion 402*s* is in the mounted state, the first-portion bottom wall 44*s* faces both a bottom wall 44 of a first liquid container 401A and a mounting bottom wall 44*a* of the adaptor mounting section 9 in the height direction, or in the +Z direction. The first-portion first sidewall 45*s* faces the first-portion second sidewall 46*s* in the width direction, or in the +X direction.

The first-portion front wall 42*s* is positioned on the downstream side of the first portion 402*s* in the insertion direction D1, in which a cartridge 4 is inserted into the cartridge attachment 6, or in the −Y direction. The first-portion rear wall 47*s* forms the downstream surface of the first portion 402*s* in the de-insertion direction, or in the +Y direction. When the first cartridge 4Ar is in the attached state, the first-portion bottom wall 44*s* is positioned on the downstream side of the first liquid container 401A in the direction of gravitational force, or in the −Z direction. In other words, the first-portion bottom wall 44*s* is positioned on the downstream side of the first liquid container 401A in the connection direction D2 as illustrated in FIG. 3. In addition, the first-portion bottom wall 44*s* intersects both the first-portion front wall 42*s* and the first-portion rear wall 47*s*. The first-portion first sidewall 45*s* is positioned on the −X direction of the first liquid container 401A, on which the first sidewall 45 and the first mounting sidewall 45*a* are also positioned. The first-portion second sidewall 46*s* is positioned on the +X direction of the first liquid container 401A, on which the second sidewall 46 and the second mounting sidewall 46*a* are also positioned. Each of the first-portion first sidewall 45*s* and the first-portion second sidewall 46*s* intersects the first-portion front wall 42*s*, the first-portion bottom wall 44*s*, and the first-portion rear wall 47*s*.

In the second embodiment, the terminal placement section 500 has a corner 89 at which the outer surfaces of the first-portion front wall 42*s* and the first-portion bottom wall 44*s* intersect each other.

The second portion 402*t* has a second-portion front wall 42*t*, a second-portion bottom wall 44*t*, a second-portion first sidewall 45*t*, a second-portion second sidewall 46*t*, and a second-portion rear wall 47*t*. The depressed shape of the second portion 402*t* is formed by the second-portion front wall 42*t*, the second-portion bottom wall 44*t*, the second-portion first sidewall 45*t*, the second-portion second sidewall 46*t*, and the second-portion rear wall 47*t*. Hereinafter, when the first cartridge 4Ar is in the attached state, of each of the second-portion front wall 42*t*, the second-portion bottom wall 44*t*, the second-portion first sidewall 45*t*, the second-portion second sidewall 46*t*, and the second-portion rear wall 47*t*, the surface facing the storage chamber 61 of the cartridge attachment 6 is referred to as the outer surface and the opposite surface is referred to as the inner surface.

The second-portion rear wall 47*t* faces the second-portion front wall 42*t* in the insertion direction D1, or in the −Y direction. When the second portion 402*t* is in the mounted state, the second-portion bottom wall 44*t* intersects both the bottom wall 44 of the first liquid container 401A and the mounting bottom wall 44*a* of the adaptor mounting section 9 in the height direction, or in the +Z direction. The second-portion first sidewall 45*t* faces the second-portion second sidewall 46*t* in the width direction, or in the +X direction.

The second-portion front wall 42*t* is positioned on the downstream side of the second portion 402*t* in the insertion direction D1, in which the cartridge 4 is inserted into the cartridge attachment 6, or in the −Y direction. The second-portion rear wall 47*t* forms the downstream surface of the first portion 402*s* on the de-insertion direction, or in the +Y direction. When the first cartridge 4Ar is in the attached state, the second-portion bottom wall 44*t* is positioned on the downstream side of the first liquid container 401A in the direction of gravitational force, or in the −Z direction. In other words, the second-portion bottom wall 44*t* is positioned on the downstream side of the first liquid container 401A in the connection direction D2 as illustrated in FIG. 3. In addition, the second-portion bottom wall 44*t* intersects both the second-portion front wall 42*t* and the second-portion rear wall 47*t*. The second-portion first sidewall 45*t* is positioned on the −X direction of the first liquid container 401A, on which the first sidewall 45 and the first mounting sidewall 45*a* are also positioned. The second-portion second sidewall 46*t* is positioned on the +X direction of the first liquid container 401A, on which the second sidewall 46 and the second mounting sidewall 46*a* are also positioned. Each of the second-portion first sidewall 45*t* and the second-portion second sidewall 46*t* intersects the second-portion front wall 42*t*, the second-portion bottom wall 44*t*, and the second-portion rear wall 47*t*.

In this embodiment, the supply-section placement chamber 461 is formed at the center of the second portion 402*t* in the insertion direction D1, or in the −Y direction. In short, the supply-section placement chamber 461 is the space defined by the second-portion front wall 42*t*, the second-portion bottom wall 44*t*, the second-portion first sidewall 45*t*, the second-portion second sidewall 46*t*, and the second-portion rear wall 47*t*. Also, it can be said that the supply-section placement chamber 461 is formed on the inner surface of the second portion 402*t* and positioned on the +Z-directional side of the insertion aperture 446, on which the adaptor mounting section 9 is also positioned.

In this embodiment, the insertion aperture 446 is formed to pass through both the inner and outer surface of the second-portion bottom wall 44*t*. In addition, the insertion aperture 446 is formed in the second-portion bottom wall 44*t* at the location where the supply-section placement chamber 461 is positioned. In this embodiment, the insertion aperture 446 may be formed at the center of the second-portion bottom wall 44*t* in both the width direction and the insertion direction D1, or in both the +X and −Y directions.

The adaptor mounting section 9 includes a first mounting mechanism 901 as a mounting mechanism 90 for mounting the first portion 402*s* onto the first liquid container 401A and also includes a second mounting mechanism 902 as the mounting mechanism 90 for mounting the second portion 402*t* onto the first liquid container 401A. In this embodiment, the first mounting mechanism 901 has a predetermined constant shape and thus can be commonly used independently of the types of the cartridges 4. In this embodiment, the first mounting mechanism 901 includes a first-side first engagement section 911s, a first-side second engagement section 914s, and a first-side third engagement section 917s, which are formed in accordance with a predetermined positional relationship. In other words, the first mounting mechanism 901 is formed of the first-side first engagement section 911s, the first-side second engagement section 914s, and the first-side third engagement section 917s. Likewise, the second mounting mechanism 902 has a predetermined constant shape and thus can be commonly used independently of the types of the cartridges 4. In this embodiment, the second mounting mechanism 902 includes a second-side first engagement section 912t, a second-side second engagement section 913t, a second-side third engagement section 915t, a second-side fourth engagement section 916t, and a second-side fifth engagement section 918t in accordance with a predetermined positional relationship. In other words, the second mounting mechanism 902 is formed of the second-side first engagement section 912t, the second-side second engagement section 913t, the second-side third engagement section 915t, the second-side fourth engagement section 916t, and the second-side fifth engagement section 918t. The first-side first engagement section 911s, the first-side second engagement section 914s, and the first-side third engagement section 917s may be projections that engage with, respectively, the recesses of first-side first corresponding engagement section 411s, a first-side second corresponding engagement section 414s, and a first-side third corresponding engagement section 417s (described later). Likewise, the second-side first engagement section 912t, the second-side second engagement section 913t, the second-side third engagement section 915t, the second-side fourth engagement section 916t, and the second-side fifth engagement section 918t may be projections that engage with, respectively, the recesses of a second-side first corresponding engagement section 412t, a second-side second corresponding engagement section 413t, a second-side third corresponding engagement section 415t, a second-side fourth corresponding engagement section 416t, and a second-side fifth corresponding engagement section 418t (described later). The state where both of the first portion 402s and the second portion 402t are mounted on the adaptor mounting section 9 is referred to as the mounted state.

As illustrated in FIG. 23, the first-side first engagement section 911s is formed on a second mounting sidewall 46a and positioned on a mounting front wall 42a side, or the −Y-directional side, with respect to a mounting central section PA of the adaptor mounting section 9. Also, it can be said that, when both the first portion 402s and the second portion 402t are in the mounted state, the first-side first engagement section 911s is positioned close to the terminal placement section 500 disposed on the insertion side, or the −Y-directional side, of the first portion 402s. The first-side second engagement section 914s is formed on the first mounting sidewall 45a and positioned on the mounting front wall 42a side, or the −Y-directional side, with respect to the mounting central section PA of the adaptor mounting section 9. Also, it can be said that, when both the first portion 402s and the second portion 402t are in the mounted state, the first-side second engagement section 914s is positioned close to the above terminal placement section 500. The first-side third engagement section 917s is positioned at the intersection of the mounting front wall 42a and the mounting bottom wall 44a. Also, it can be said that, when both the first portion 402s and the second portion 402t are in the mounted state, the first-side third engagement section 917s is positioned close to the above terminal placement section 500.

As illustrated in FIG. 23, both the second-side first engagement section 912t and the second-side second engagement section 913t are formed on the second mounting sidewall 46a and positioned on a mounting rear wall 47a side, or the +Y-directional side, with respect to the mounting central section PA of the adaptor mounting section 9. Also, it can be said that, when both the first portion 402s and the second portion 402t are in the mounted state, both the second-side first engagement section 912t and the second-side second engagement section 913t are positioned on the liquid supply section 442 side, which is opposite to the terminal placement section 500 side in the +Y direction. Likewise, both the second-side third engagement section 915t and the second-side fourth engagement section 916t are formed on the first mounting sidewall 45a and positioned on the mounting rear wall 47a side, or on the +Y-directional side, with respect to the mounting central section PA of the adaptor mounting section 9. Also, it can be said that, when both the first portion 402s and the second portion 402t are in the mounted state, both the second-side third engagement section 915t and the second-side fourth engagement section 916t are positioned on the above liquid supply section 442 side. The second-side fifth engagement section 918t is positioned at the intersection of the mounting bottom wall 44a and the mounting rear wall 47a. Also, it can be said that the second-side fifth engagement section 918t is positioned on the above liquid supply section 442 side. It should be noted that the locations, number, and shapes of the first-side first engagement section 911s, the first-side second engagement section 914s, the first-side third engagement section 917s, the second-side first engagement section 912t, the second-side second engagement section 913t, the second-side third engagement section 915t, the second-side fourth engagement section 916t, and the second-side fifth engagement section 918t are not limited to the above. In fact, only at least one of the first-side first engagement section 911s, the first-side second engagement section 914s, and the first-side third engagement section 917s may be formed as the first mounting mechanism 901 and receive the first portion 402s. Likewise, only at least one of the second-side first engagement section 912t, the second-side second engagement section 913t, the second-side third engagement section 915t, the second-side fourth engagement section 916t, and the second-side fifth engagement section 918t may be formed as the second mounting mechanism 902 and receive the second portion 402t.

As illustrated in FIG. 23, the first portion 402s includes, as the first mounting mechanism 901, the first-side first corresponding engagement section 411s, the first-side second corresponding engagement section 414s, and the first-side third corresponding engagement section 417s, which engage with, respectively, the first-side first engagement section 911s, the first-side second engagement section 914s, and the first-side third engagement section 917s. The first-side first corresponding engagement section 411s, the first-side second corresponding engagement section 414s, and the first-side third corresponding engagement section 417s may be depressed to receive, respectively, the projections of the first-side first engagement section 911s, the first-side second engagement section 914s, and the first-side third engagement section 917s. The first-side first corresponding engagement section 411s is positioned to engage with the first-side first engagement section 911s. The first-side second corresponding engagement section 414s is positioned to engage with the first-side second engagement section 914s. The first-side third corresponding engagement section 417*s* is positioned to engage with the first-side third engagement section 917*s*.

The second portion 402*t* includes, as the second mounting mechanism 902, the second-side first corresponding engagement section 412*t*, the second-side second corresponding engagement section 413*t*, the fifth adaptor-side engagement section 415, the second-side fourth corresponding engagement section 416*t*, and the second-side fifth corresponding engagement section 418*t*, which engage with, respectively, the second-side first engagement section 912*t*, the second-side second engagement section 913*t*, the second-side third engagement section 915*t*, the second-side fourth engagement section 916*t*, and the second-side fifth engagement section 918*t*. The second-side first corresponding engagement section 412*t*, the second-side second corresponding engagement section 413*t*, the second-side third corresponding engagement section 415*t*, the second-side fourth corresponding engagement section 416*t*, and the second-side fifth corresponding engagement section 418*t* may be depressed to receive, respectively, the projections of the second-side first engagement section 912*t*, the second-side second engagement section 913*t*, the second-side third engagement section 915*t*, the second-side fourth engagement section 916*t*, and the second-side fifth engagement section 918*t*. The second-side fifth corresponding engagement section 412*t* is positioned to engage with the second-side first engagement section 912*t*. The second-side second corresponding engagement section 413*t* is positioned to engage with the second-side second engagement section 913*t*. The second-side third corresponding engagement section 415*t* is positioned to engage with the second-side third engagement section 915*t*. The second-side fourth corresponding engagement section 416*t* is positioned to engage with the second-side fourth engagement section 916*t*. The second-side fifth corresponding engagement section 418*t* is positioned to engage with the second-side fifth engagement section 918*t*. It should be noted that neither the first portion 402*s* nor the second portion 402*t* is mounted onto the adaptor central section PO of the adaptor mounting section 9 in this embodiment.

In this embodiment, the first-side first engagement section 911*s*, the first-side second engagement section 914*s*, and the first-side third engagement section 917*s* may engage with, respectively, the first-side first corresponding engagement section 411*s*, the first-side second corresponding engagement section 414*s*, and the first-side third corresponding engagement section 417*s*. Furthermore, the second-side first engagement section 912*t*, the second-side second engagement section 913*t*, the second-side third engagement section 915*t*, the second-side fourth engagement section 916*t*, and the second-side fifth engagement section 918*t* may engage with, respectively, the second-side first corresponding engagement section 412*t*, the second-side second corresponding engagement section 413*t*, the second-side third corresponding engagement section 415*t*, the second-side fourth corresponding engagement section 416*t*, and the second-side fifth corresponding engagement section 418*t*. In this way, both the first portion 402*s* and the second portion 402*t* are mounted onto the adaptor mounting section 9.

As illustrated in FIGS. 23 and 24, the second cartridge 4Br differs from the first cartridge 4Ar, in the lengths of a liquid storage 450 in the width direction and in the insertion direction D1. In this embodiment, the length of a second liquid storage 450B in the width direction, or in the +X direction, is shorter than that of a first liquid storage 450A. In this embodiment, the length of the second liquid storage 450B in the insertion direction D1, or in the −Y direction, is also shorter than that of the first liquid storage 450A. In short, the lengths of the second liquid storage 450B formed in the second cartridge 4Br in the width direction and the insertion direction D1 are shorter than those of the first liquid storage 450A formed in the first cartridge 4Ar. In which case, the amount of the liquid that can be contained in the second liquid storage 450B is smaller than the amount of the liquid that can be contained in the first liquid storage 450A. In other words, the capacity of the second liquid storage 450B is smaller than that of the first liquid storage 450A.

Except for the lengths of the second liquid storage 450B in the width direction and the insertion direction D1, the configuration of the second cartridge 4Br is substantially the same as that of the first cartridge 4Ar. Thus, an adaptor mounting section 9 and an adaptor 402 in the second cartridge 4Br have substantially the same shapes as those in the first cartridge 4Ar. This means that the first portion 402*s* and the second portion 402*t* can be commonly used as an adaptor 402 for both the cartridges 4Ar and 4Br that include, respectively, the first liquid storage 450A and the second liquid storage 450B having different capacities. It is therefore possible to alter the shape of the liquid storage 450 without involving a redesign of the entire cartridge 4 even if the capacity of a liquid storage 450 in an existing cartridge 4 is changed or even if a plurality of cartridges 4 in which respective liquid storages 450 have different capacities are designed.

When the direction orthogonal to the insertion direction D1 is represented by the width direction and the direction orthogonal to both the insertion direction D1 and the width direction is represented by the height direction, the length of the first liquid storage 450A in the height direction may differ from that of the second liquid storage 450B. Even in this case, the first portion 402*s* and the second portion 402*t* can be commonly used as an adaptor 402 for both the cartridges 4Ar and 4Br that include the liquid storages 450 having different capacities.

In the above embodiment, a cartridge 4 includes: a liquid container 401 having a liquid storage 450 and a liquid supply section 442; a liquid supply section 442; and a first portion 402*s* and a second portion 402*t* constituting an adaptor 402 via which the liquid container 401 is coupled to a printing apparatus 10. The liquid container 401, the first portion 402*s*, and the second portion 402*t* are formed as independent components. In this case, each of an adaptor mounting section 9 of the liquid container 401 and both the first portion 402*s* and the second portion 402*t* constituting the adaptor 402 has a predetermined constant shape that is independent of the capacity of the liquid storage 450. It is therefore possible to alter the shape of the liquid storage 450 without involving a redesign of the entire cartridge 4 even if the capacity of a liquid storage 450 in an existing cartridge 4 is changed or even if a plurality of cartridges 4 in which respective liquid storages 450 have different capacities are designed. In which case, the redesign of the cartridge 4 can be made in a short time because only a few portions of the cartridge 4 need to be redesigned. It is thus only necessary to prepare the mold for the liquid storage 450, and it is thus unnecessary to prepare the mold for the entire cartridge 4, which can lead to a reduction in mold costs.

According to a second embodiment of the present disclosure, an adaptor 402 is formed of two independent portions: a first portion 402*s* provided with a terminal placement section 500; and a second portion 402*t* provided with an insertion aperture 446. Each of an adaptor mounting section 9 of the liquid container 401 and both the first portion 402*s* and the second portion 402*t* constituting the adaptor 402 has a predetermined constant shape. With this configuration, even if the capacity of the circuit board 50 is changed, the adaptor 402 can be commonly used by altering the length of the liquid storage 450 in at least one of the insertion direction D1, the width direction, and the height direction.

C-1. Modification 1

In the foregoing first and second embodiments, the projections of the first container-side engagement section 911 to the eighth container-side engagement section 918, which constitute the mounting mechanism 90, engage with, respectively, the recesses of the first adaptor-side engagement section 411 to the eighth adaptor-side engagement section 418. In this way, the adaptor 402 mounted onto the adaptor mounting section 9 of the liquid storage 450. However, the configuration of the mounting mechanism 90 is not limited to the above. Instead of the first container-side engagement section 911 to the eighth container-side engagement section 918 and the first adaptor-side engagement section 411 to the eighth adaptor-side engagement section 418, the mounting mechanism 90 may include screws or pins, and the adaptor 402 is mounted onto the adaptor mounting section 9 of the liquid storage 450 through those screws or pins. In this case, the adaptor 402 may have holes through which the screws or pins will pass. The adaptor mounting section 9 may have recesses to which the heads of the screws or the base ends of the sins are to be fixed. In such modifications, the adaptor 402 can also be commonly used independently of the capacity of the liquid storage 450.

C-2. Modification 2

In the foregoing first and second embodiments, the projections of the first container-side engagement section 911 to the eighth container-side engagement section 918, which constitute the mounting mechanism 90, engage with, respectively, the recesses of the first adaptor-side engagement section 411 to the eighth adaptor-side engagement section 418. In this way, the adaptor 402 is mounted onto the adaptor mounting section 9 of the liquid storage 450. However, the configuration of the mounting mechanism 90 is not limited to the above. Instead of the first container-side engagement section 911 to the eighth container-side engagement section 918 and the first adaptor-side engagement section 411 to the eighth adaptor-side engagement section 418, the mounting mechanism 90 may include a binding material such as an adhesive tape, and the adaptor 402 is mounted onto the adaptor mounting section 9 of the liquid storage 450 through this binding material. In this case, each of the adaptor 402 and the adaptor mounting section 9 may have a region to which the binding material is to be applied. In such modifications, the adaptor 402 can also be commonly used independently of the capacity of the liquid storage 450.

C-3. Modification 3

In the foregoing first and second embodiments, the projections of the first container-side engagement section 911 to the eighth container-side engagement section 918, which constitute the mounting mechanism 90, engage with, respectively, the recesses of the first adaptor-side engagement section 411 to the eighth adaptor-side engagement section 418. In this way, the adaptor 402 is mounted onto the adaptor mounting section 9 of the liquid storage 450. However, the configuration of the mounting mechanism 90 is not limited to the above. Alternatively, to mount the adaptor 402 onto the adaptor mounting section 9, the adaptor 402 may be slid along the adaptor mounting section 9 in the insertion direction D1, or in the −Y direction. In this case, each of the adaptor 402 and the adaptor mounting section 9 may have a slide mechanism as the mounting mechanism 90. Through this slide mechanism, both the adaptor 402 and the adaptor mounting section 9 may be slid relative to each other while they are abutted against each other, so that the adaptor 402 is mounted onto the adaptor mounting section 9. In such modifications, the adaptor 402 can also be commonly used independently of the capacity of the liquid storage 450.

C-4. Modification 4

In the foregoing first and second embodiments, the first liquid storage 450A contains a black ink, whereas the second liquid storage 450B, which has a smaller capacity than that of the first liquid storage 450A, contains another color ink. However, the configuration of the liquid storages 450 is not limited to the above. As an alternative example, each of the first liquid storage 450A and the second liquid storage 450B may contain any liquid other than cyan, magenta, yellow, and black inks. As another alternative example, each of the first liquid storage 450A and the second liquid storage 450B may contain an ink having a function other than coloration.

The present disclosure is not limited to the foregoing first and second embodiments and modifications and may be implemented in various configurations without departing from the spirits of the appended claims. For example, the technical features of the first and second embodiments and modifications which correspond to those of the aspects described in the Summary may be replaced or combined as appropriate for the purpose of addressing same or all of the above problems or accomplishing some or all of the above effects. Moreover, such technical features may be deleted as appropriate unless they are described as essential herein.

(1) A first aspect of the present disclosure provides a cartridge. The cartridge is to be detachably attached to a cartridge attachment in a printing apparatus, which includes an apparatus-side terminal and a liquid introduction section that receives a liquid. The cartridge includes: a liquid container that includes a liquid storage which contains the liquid to be supplied to the printing apparatus; a liquid supply section configured to supply the liquid contained in the liquid storage to the liquid introduction section; an adaptor mounting section; and an adaptor that is mounted on the adaptor mounting section and that includes a terminal placement section in which a cartridge-side terminal electrically connected to the apparatus-side terminal disposed and an insertion aperture through which the liquid introduction section passes. The adaptor mounting section has a mounting mechanism for mounting the adaptor, the mounting mechanism having a predetermined constant structure.

According to the above aspect, an adaptor and an adaptor mounting section of a liquid container each have a predetermined constant shape that is independent of the capacity of a liquid storage. It is therefore possible to alter the shape of the liquid storage without involving a redesign of an entire cartridge even is the capacity of the liquid storage is changed.

(2) In addition to the configuration of the first aspect, the mounting mechanism may have a plurality of container-side engagement sections formed in accordance with a predetermined positional relationship. The adaptor may have a plurality of adaptor-side engagement sections that mount the liquid container by engaging with the respective container-side engagement sections.

According to the above aspect, by causing container-side engagement sections to engage with respective adaptor-side engagement sections, a liquid container and an adaptor formed as independent components are made attachable to a cartridge attachment. In this case, an adaptor can be fixed to the liquid container at a plurality of locations. It is therefore possible to reduce the risk of the adaptor being accidentally removed from the liquid container when the adaptor is in the mounted state.

(3) In addition to the configuration of the first aspect, the adaptor may include a first portion provided with the terminal placement section and a second portion provided with the insertion aperture; the first portion and the second portion may be formed as independent components. The adaptor mounting section may have a first mounting mechanism as the mounting mechanism for mounting the first portion and may also have a second mounting mechanism as the mounting mechanism for mounting the second portion. The first portion may be mounted on the adaptor mounting section through the first mounting mechanism, whereas the second portion may be mounted on the adaptor mounting section through the second mounting mechanism.

According to the above aspect, an adaptor and an adaptor mounting section of a liquid container each have a predetermined constant shape that is independent of the capacity of a liquid storage. It is therefore possible to alter the shape of the liquid storage without involving a redesign of an entire cartridge even if the capacity of the liquid storage is changed.

(4) A second aspect of the present disclosure provides a printing system. The printing system includes: a printing apparatus that has a cartridge attachment to which a cartridge is to be attached; and a plurality of cartridges according to the above aspect. The plurality of cartridges include a first cartridge and a second cartridge and are detachably attached to the cartridge attachment. The first cartridge has a first liquid storage as the liquid storage, whereas the second cartridge has a second liquid storage as the liquid storage. The first liquid storage and the second cartridge have different capacities.

According to the above aspect, an adaptor and an adaptor mounting section of a liquid container each have a predetermined constant shape that is independent of the capacity of a liquid storage. It is therefore possible to alter the shape of the liquid storage without involving a redesign of the entire cartridge even if the capacity of a liquid storage in an existing cartridge is changed or even if a plurality of cartridges in which respective liquid storages have different capacities are designed.

(5) In addition to the configuration of the second aspect, when a direction orthogonal to an insertion direction of the cartridges is represented by a width direction, and a direction orthogonal to both the insertion direction and the width direction is represented by a height direction, a length of the first liquid storage in at least one of the width direction and the height direction may differ from a length of the second liquid storage so that the first liquid storage and the second liquid storage have different capacities.

According to the above aspect, by changing the length of a liquid storage of a liquid container in at least one of a width direction and a height direction, an adaptor can be commonly used for the liquid storage even if the capacity of the liquid storage is changed.

(6) A third aspect of the present disclosure provides a printing system. The printing system includes: a printing apparatus that has a cartridge attachment to which a cartridge is to be attached; and a plurality of cartridges according to the above aspect. The plurality of cartridges include a first cartridge and a second cartridge and are detachably attached to the cartridge attachment. The first cartridge has a first liquid storage as the liquid storage, whereas the second cartridge has a second liquid storage as the liquid storage. The first liquid storage and the second cartridge have different capacities. When a direction $6 orthogonal to an insertion direction of the cartridges is represented by a width direction, and a direction orthogonal to both the insertion direction and the width direction is represented by a height direction, a length of the first liquid storage in at least one of the insertion direction, the width direction, and the height direction differs from a length of the second liquid storage so that the first liquid storage and the second liquid storage have different capacities.

According to the configuration of the above aspect, by changing the length of a liquid storage of a liquid container in at least one of an insertion direction of cartridges, a width direction, and a height direction, an adaptor can be commonly used for the liquid storage even if the capacity of the liquid storage is changed.

(7) In addition to the third aspect, the capacity of the first liquid storage may be larger than the capacity of the second liquid storage. The liquid contained in the first liquid storage may be a black ink. The liquid contained in the second liquid storage may be an ink having a different color from the black ink.

According to the above aspect, the black ink can be contained in a first liquid storage that has a larger capacity than that of a second liquid storage even when a black ink is used frequently.

It should be noted that not all the components described in the aspects of the present disclosure are essential. To address some or all of the above problems or accomplish some or all of the above effects herein, some of the components may be appropriately modified, deleted, or replaced with new other components, or some of the limitations of the components may be appropriately deleted. To address some or all of the above problems or accomplish some or all of the above effects herein, an independent aspect of the present disclosure may be conceived of by combining some or all technical features included in some aspects of the present disclosure with those included in other aspects of the present disclosure.

The present disclosure can also be implemented in some applications other than a cartridge and a printing system. For example, the present disclosure can be implemented in a method of manufacturing a cartridge and a printing system and a mechanism for attaching a cartridge to a cartridge attachment.

What is claimed is:

1. A printing system comprising:

a printing apparatus having a cartridge attachment to which a cartridge is to be attached;

a plurality of cartridges to be detachably attached to a cartridge attachment in a printing apparatus, the printing apparatus including an apparatus-side terminal and a liquid introduction section that receives a liquid, each of the cartridges comprising:

a liquid container including a liquid storage having a plurality of side walls extending in a first direction and containing the liquid to be supplied to the printing apparatus, a liquid supply section configured to supply the liquid contained in the liquid storage to the liquid introduction section in the first direction, and an adaptor mounting section; and an adaptor mounted on the adaptor mounting section, the adaptor including a terminal placement section in which a cartridge-side terminal electrically connected to the apparatus-side terminal is disposed and an insertion aperture through which the liquid introduction section passes, wherein each adaptor is entirely overlapped by the liquid storage when seen in the first direction, and the adaptor mounting section has a mounting mechanism for mounting the adaptor, the mounting mechanism having a predetermined constant structure, wherein the plurality of cartridges including a first cartridge and a second cartridge, the cartridges being detachably attached to the cartridge attachment, the first cartridge has a first liquid container including a first liquid storage, the second cartridge has a second liquid container including a second liquid storage, the first liquid storage and the second liquid storage having different capacities, when a direction orthogonal to an insertion direction of the cartridges is represented by a width direction, and a direction orthogonal to both the insertion direction and the width direction is represented by a height direction, a length of the first liquid storage in at least one of the width direction and the height direction differs from a length of the second liquid storage so that the first liquid storage and the second liquid storage have different capacities the first cartridge includes only a single first liquid supply section, the second cartridge includes only a single second liquid supply section, the first liquid container includes a first adaptor mounting section having a first mounting mechanism, the second liquid container includes a second adaptor mounting section having a second mounting mechanism, and the first and the second mounting mechanisms have the same predetermined constant structure.

2. The printing system according to claim 1, wherein each mounting mechanism has a plurality of container-side engagement sections formed in accordance with a predetermined positional relationship, and each adaptor has a plurality of adaptor-side engagement sections that mount the liquid container by engaging with the respective container-side engagement sections.

3. The printing system according to claim 1, wherein each adaptor includes a first portion provided with the terminal placement section and a second portion provided with the insertion aperture, the first portion and the second portion being formed as independent components, each mounting mechanism includes a first portion-mounting mechanism for mounting the first portion and a second portion-mounting mechanism for mounting the second portion, the first portion is mounted on the adaptor mounting section through the first portion-mounting mechanism, and the second portion is mounted on the adaptor mounting section through the second portion-mounting mechanism.

4. The printing system according to claim 1, wherein the liquid contained in the first liquid storage is a black ink, and the liquid contained in the second liquid storage is an ink having a different color from the black ink.

* * * * *